US 12,452,350 B2

(12) United States Patent
Yun et al.

(10) Patent No.: US 12,452,350 B2
(45) Date of Patent: Oct. 21, 2025

(54) DEVICE FOR IMPROVING ANTENNA RADIATION PERFORMANCE IN ELECTRONIC DEVICE HAVING FOLDED STRUCTURE, AND METHOD THEREFOR

(71) Applicant: Samsung Electronics Co., Ltd., Suwon-si (KR)

(72) Inventors: Himchan Yun, Suwon-si (KR); Junwoo Kim, Suwon-si (KR); Sungkoo Park, Suwon-si (KR); Cheolhong Son, Suwon-si (KR); Kyungjae Lee, Suwon-si (KR); Sangha Lee, Suwon-si (KR); Soonho Hwang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 291 days.

(21) Appl. No.: 18/311,532

(22) Filed: May 3, 2023

(65) Prior Publication Data

US 2023/0269314 A1    Aug. 24, 2023

Related U.S. Application Data

(63) Continuation of application No. PCT/KR2021/015770, filed on Nov. 3, 2021.

(30) Foreign Application Priority Data

Nov. 5, 2020  (KR) .................. 10-2020-0147057

(51) Int. Cl.
  *H04M 1/02*   (2006.01)
  *H01Q 1/24*   (2006.01)
  *H04B 1/00*   (2006.01)

(52) U.S. Cl.
  CPC .......... *H04M 1/0214* (2013.01); *H01Q 1/243* (2013.01); *H04B 1/005* (2013.01)

(58) Field of Classification Search
  CPC ............. H04M 1/0206; H04M 1/0208; H04M 1/0214; H04M 1/0216; H04M 1/0218;
  (Continued)

(56) References Cited

U.S. PATENT DOCUMENTS 10,079,425 B2    9/2018  Chun et al.
11,870,923 B2*   1/2024  Kim ...................... H01Q 5/378
  (Continued)

FOREIGN PATENT DOCUMENTS

CN    209860131 U    12/2019
JP    3824579 B2     9/2006
  (Continued)

OTHER PUBLICATIONS

Yoon et al., "Electronic Device Including Antenna Device", KR 20200101310 A, Aug. 27, 2020, (English Text). (Year: 2020).*
  (Continued)

*Primary Examiner* — Quochien B Vuong
(74) *Attorney, Agent, or Firm* — Jefferson IP Law, LLP

(57) ABSTRACT

An electronic device is provided. The electronic device includes a first housing, a second housing connected to the first housing through a connection member and a wireless communication circuit. A first portion of a first edge of the first housing is formed of a conductive material, an insulating member is disposed on one end of the first portion, and a conductive region of the connection member is connected to another end of the first portion, and a first point of the first portion is connected to a feed point through a capacitor. The second housing includes a second edge having a second length corresponding to the first length, a second portion of the second edge is formed of a conductive material, an opening formed adjacently along the second portion, an insulating member is disposed on one end of the second portion, and the conductive region of the connection mem-
  (Continued)

ber is connected to another end of the second portion, and a switch is disposed between a first point of the second portion and a ground region. The wireless communication circuit may control the switch to electrically open the first point of the second portion and the ground region.

20 Claims, 20 Drawing Sheets

(58) Field of Classification Search
CPC ............ H04M 1/0222; H04M 1/0225; H04M 1/0227; H04B 1/005; H01Q 1/12; H01Q 1/24; H01Q 1/241; H01Q 1/242; H01Q 1/243

See application file for complete search history.

(56) References Cited

U.S. PATENT DOCUMENTS

| | | |
|---|---|---|
| 2017/0141820 A1 | 5/2017 | Kim et al. |
| 2017/0346164 A1 | 11/2017 | Kim et al. |
| 2019/0005857 A1 | 1/2019 | Wakata |
| 2020/0076062 A1 | 3/2020 | Lee et al. |
| 2020/0245481 A1 | 7/2020 | Yoon et al. |
| 2020/0303809 A1 | 9/2020 | Jung et al. |
| 2020/0333855 A1 | 10/2020 | Kim et al. |
| 2021/0318720 A1 | 10/2021 | Lin et al. |
| 2022/0061175 A1 | 2/2022 | Oh et al. |
| 2022/0115768 A1 | 4/2022 | Oh et al. |
| 2023/0402737 A1* | 12/2023 | Lai .......................... H01Q 5/385 |

FOREIGN PATENT DOCUMENTS

| | | |
|---|---|---|
| JP | 4388435 B2 | 12/2009 |
| KR | 10-2019-0024497 A | 3/2019 |
| KR | 10-2020-0031607 A | 3/2020 |
| KR | 10-2020-0072190 A | 6/2020 |
| KR | 10-2020-0100986 A | 8/2020 |
| KR | 10-2020-0101310 A | 8/2020 |
| WO | 2020/135150 A1 | 7/2020 |

OTHER PUBLICATIONS

International Search Report dated Mar. 2, 2022, issued in International Application No. PCT/KR2021/015770.
Extended European Search Report dated Mar. 21, 2024, issued in European Patent Application No. 21889541.5.
Korean Notice of Patent Grant dated Jun. 11, 2025, issued in Korean Patent Application No. 10-2020-0147057.

* cited by examiner

DEVICE FOR IMPROVING ANTENNA RADIATION PERFORMANCE IN ELECTRONIC DEVICE HAVING FOLDED STRUCTURE, AND METHOD THEREFOR

CROSS-REFERENCE TO RELATED APPLICATION(S)

This application is a continuation application, claiming priority under § 365(c), of an International application No. PCT/KR2021/015770, filed on Nov. 3, 2021, which is based on and claims the benefit of a Korean patent application number 10-2020-0147057, filed on Nov. 5, 2020, in the Korean Intellectual Property Office, the disclosure of which is incorporated by reference herein in its entirety.

BACKGROUND

1. Field

The disclosure relates to a device and method for improving antenna radiation performance in an electronic device having a folded structure.

2. Description Related Art

An electronic device may include a plurality of antenna radiators to transmit and/or receive signals in various frequency bands. For example, a plurality of antennas may be designed to transmit and/or receive in a specific frequency band of a low band (LB) (e.g., a frequency band between about 600 megahertz (MHZ) and about 1,000 MHZ) or a high band (HB) (e.g., a frequency band between about 2,300 MHz and about 3,000 MHZ).

Recently, a foldable electronic device having a foldable structure has been released to enhance portability. The foldable electronic device may be connected, via a connection member, to two housings different from each other, and be folded or unfolded around the connecting member.

The above information is presented as background information only to assist with an understanding of the disclosure. No determination has been made, and no assertion is made, as to whether any of the above might be applicable as prior art with regard to the disclosure.

SUMMARY

In an electronic device, the radiation of an antenna supporting a band of about 600 MHz to about 1000 MHz may utilize the J1 mode of the characteristic modes of surface current distributions on the antenna ground, and in a case of a foldable electronic device, the current flows in opposite directions may be formed in a state where two housings are folded around a connecting member.

When a plurality of antenna radiators are positioned adjacent to each other, if currents flow in directions opposite to each other in the plurality of adjacent antenna radiators, radiation efficiency of the antenna may be deteriorated due to the currents formed in the opposite directions.

Aspects of the disclosure are to address at least the above-mentioned problems and/or disadvantages and to provide at least the advantages described below. Accordingly, an aspect of the disclosure is to provide a device and method for improving antenna radiation performance in an electronic device having a foldable structure.

Additional aspects will be set forth in part in the description which follows and, in part, will be apparent from the description, or may be learned by practice of the presented embodiments.

In accordance with an aspect of the disclosure, an electronic device is provided. The electronic device includes a first housing, a second housing connected to the first housing via a connection member to be rotatable with respect to the first housing, and a wireless communication circuit disposed in the first housing or the second housing, wherein the first housing includes a first edge having a first length, a first portion of the first edge is formed of a conductive material, an insulation member is disposed at one end of the first portion, and a conductive area of the connection member is connected another end of the first portion, a first point of the first portion is connected to a feeding point via a capacitor having a designated value, the second housing includes a second edge having a second length corresponding to the first length of the first edge, a second portion of the second edge corresponding to the first portion is formed of a conductive material, the second housing includes an opening formed along and adjacent to the second portion, an insulation member is disposed at one end of the second portion, and the conductive area of the connection member is connected to another end of the second portion, a switch is disposed between a first point of the second portion and a ground area, and the wireless communication circuit controls the switch when the first housing and the second housing face each other, thereby electrically opening the ground area and the first point of the second portion.

In accordance with another aspect of the disclosure, an electronic device is provided. The electronic device includes a wireless communication circuit disposed in the electronic device, wherein the electronic device includes a first edge having a first length and a second edge having a second length, a first portion of the first edge is formed of a conductive material, an insulation member is disposed at one end of the first portion, a first point of the first portion is connected to a feeding point via a capacitor having a designated value, when the electronic device is in a folded state, the second edge corresponding to the first edge is included, a second portion of the second edge corresponding to the first portion is formed of a conductive material, an opening formed along and adjacent to the second portion is included, an insulation member is disposed at one end of the second portion, the other end of the second portion is electrically connected to a conductive area of the first portion, a switch is disposed between a first point of the second portion and a ground area, and the wireless communication circuit controls the switch when the electronic device is in a folded state, thereby electrically opening the ground area and the first point of the second portion.

According to various embodiments of the disclosure, a foldable electronic device may configure the current flows of two housings in the same direction as each other while the two housings are folded with each other around a connection member, thereby improving radiation performance.

In addition, by switching to utilize a J1 mode in an unfolded state of a foldable electronic device, the foldable electronic device may improve antenna radiation performance in not only a folded state but also an unfolded state.

Furthermore, the effect may be substantially the same when the foldable electronic device is even in a form of a vertical fold (V-fold) or a form having the size of a laptop as well as in a form of a horizontal fold (H-fold).

In addition, various effects identified directly or indirectly via the disclosure may be provided.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1A:
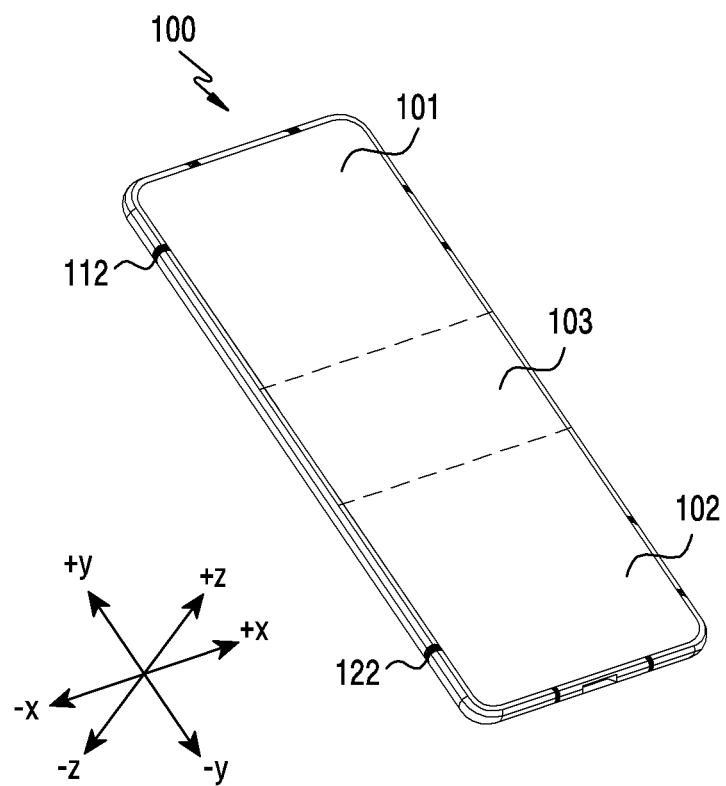
FIG. 1A is a perspective view of one surface of an electronic device according to an embodiment of the disclosure.
Figure 1B:
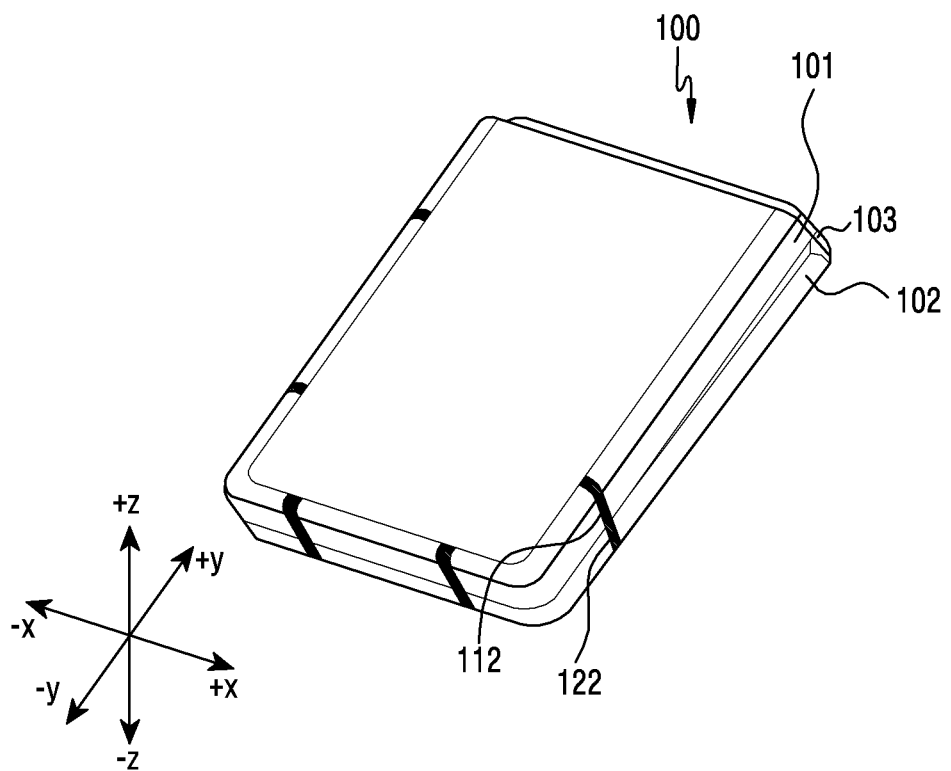
FIG. 1B illustrates a state where an electronic device is folded according to an embodiment of the disclosure.

FIG. 1A is a perspective view of one surface of an electronic device 100 when the electronic device 100 is in an unfolded state according to an embodiment of the disclosure. FIG. 1B shows a state where an electronic device 100 is folded according to an embodiment of the disclosure.

Referring to FIG. 1A, the electronic device 100 according to various embodiments may include a first housing 101, a second housing 102, and a connection member 103 allowing the second housing 102 to be rotatable with respect to the first housing 101.

According to an embodiment, when viewed from a rear surface (e.g., a surface located in the +z-axis direction of the electronic device 100 in FIG. 1A) of the electronic device 100, the first housing 101 and the second housing 102 may be structurally connected to the connection member 103. For example, the first housing 101 and the second housing 102 may be physically connected to the connection member 103 via a fastening tool. According to an embodiment, the first housing 101, the second housing 102, or the connection member 103 may include a conductive material such as aluminum or stainless steel. For example, the connection member 103 may imply a hinge structure.

According to an embodiment, at least one first insulation member 112 may be formed in at least a part of the first housing 101, and at least one second insulation member 122 may be formed in at least a part of the second housing 102.

According to an embodiment, the electronic device 100 may include a flexible display (not shown). For example, the flexible display may be disposed on a front surface of the electronic device 100, and the flexible display may be folded or unfolded as the first housing 101 rotates with respect to the second housing. As a result, the flexible display may be folded or unfolded according to an angle between the first housing 101 and the second housing 102.

Referring to FIG. 1B, the electronic device 100 according to various embodiments may be changed to a folded state or an unfolded state by the rotation of the first housing 101 and the second housing 102 around the connection member 103.

According to an embodiment, when the electronic device 100 is in a folded state, the at least one first insulation member 112 included in at least a part of the first housing 101 and the at least one second insulation member 122 included in at least a part of the second housing 102 may be formed at positions corresponding to each other. For example, when viewed from the +z-axis direction in a folded state of the electronic device 100, the at least one first insulation member 112 may overlap the at least one second insulation member 122.

Figure 2A:
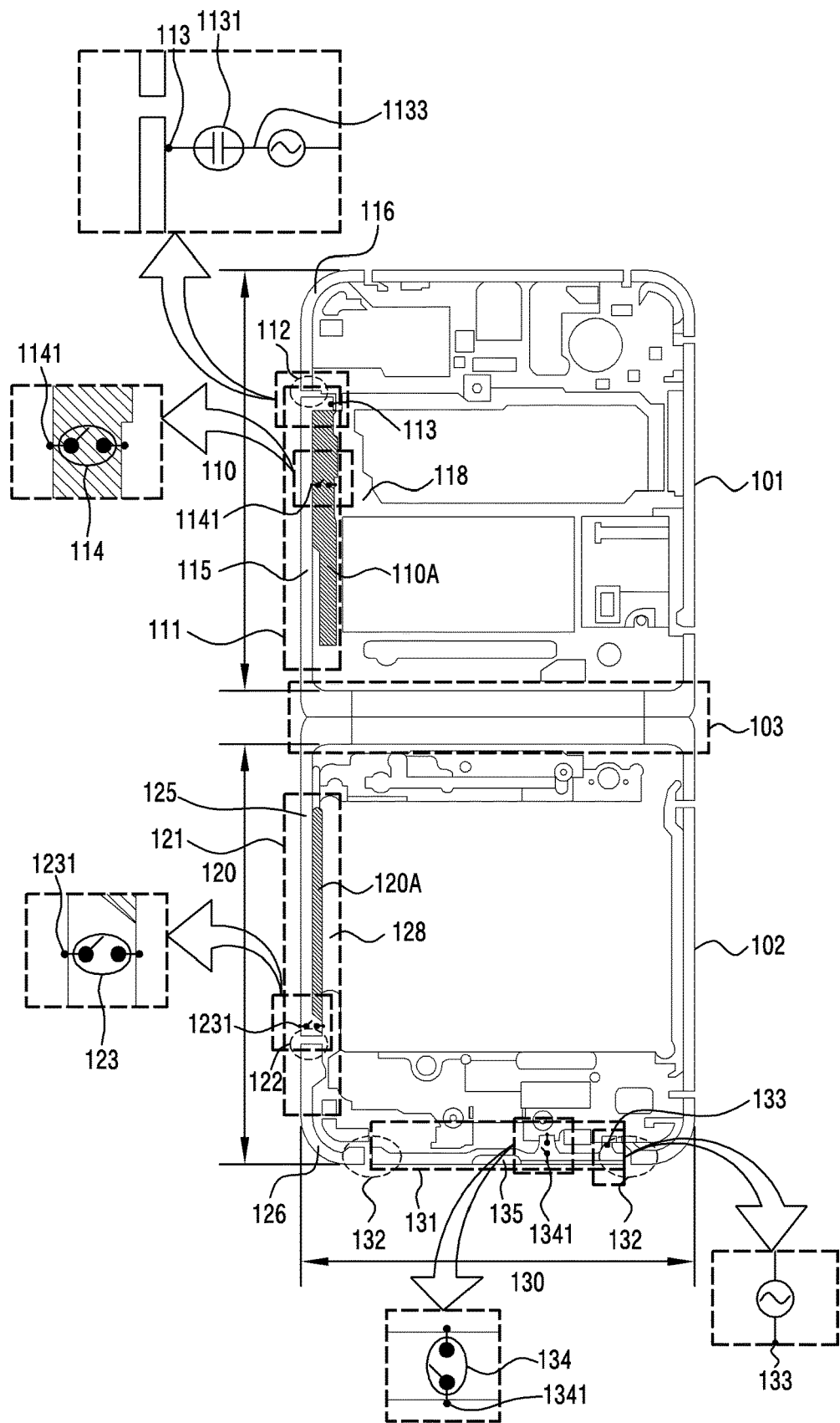
FIG. 2A illustrates an antenna radiator of an electronic device according to an embodiment of the disclosure.

FIG. 2A illustrates a first portion 111 and a second portion 121 operating as antenna radiators in an electronic device 100 according to an embodiment of the disclosure.

Referring to FIG. 2A, an electronic device 100 according to various embodiments may include a first housing 101, a second housing 102, and a connection member 103, and a first edge 110 of the first housing 101 and a second edge 120 of the second housing 102 may include a conductive material which may operate as an antenna radiator.

According to an embodiment, the first housing may include a first lateral surface member 115, a second lateral surface member 116, a first insulation member 112, and/or a first support member 118. In an example, the first support member 118 may be integrally formed with or be formed to be coupled to the first lateral surface member 115 or the second lateral surface member 116. In another example, a first opening 110A may be formed between the first lateral surface member 115 and the first support member 118. For example the first portion 111 of the first edge 110 may include at least a part of the first lateral surface member 115, the first insulation member 112, the first opening 110A, or at least a part of the first support member 118.

According to an embodiment, the first portion 111 of the first edge 110 may include a conductive material. The first insulation member 112 may be disposed between the first lateral surface member 115 and the second lateral surface member 116. According to an embodiment, the first lateral surface member 115, the second lateral surface member 116, and/or the first support member 118 may include a conductive material. For example, the first lateral surface member 115, the second lateral surface member 116, and/or the first support member 118 may include a conductive material such as copper (Cu), aluminum (Al), silver (Ag), tin (Sn), gold (Au), nickel (Ni), lead (Pb), titanium (Ti), or an alloy thereof. The first lateral surface member 115 may be electrically connected to the connection member 103.

According to an embodiment, the second housing 102 may include a third lateral surface member 125, a fourth lateral surface member 126, the second insulation member 122, and/or a second support member 128. In an example, the second support member 128 may be integrally formed with or be formed to be coupled to the third lateral surface member 125, or the fourth lateral surface member 126. In another example, a second opening 120A may be formed between the third lateral surface member 125 and the second support member 128. For example, the second portion 121 of the second edge 120 may include at least a part of the third lateral surface member 125, at least a part of the fourth lateral surface member 126, the second insulation member 122, the second opening 120A, or at least a part of the second support member 128.

According to an embodiment, the second portion 121 of the second edge 120 may include a conductive material. The second insulation member 122 may be disposed between the third lateral surface member 125 and the fourth lateral surface member 126. According to an embodiment, the third lateral surface member 125, the fourth lateral surface member 126, and/or the second support member 128 may include a conductive material. For example, the third lateral surface member 125, the fourth lateral surface member 126, and/or the second support member 128 may include a conductive material such as copper (Cu), aluminum (Al), silver (Ag), tin (Sn), gold (Au), nickel (Ni), lead (Pb), titanium (Ti), or an alloy thereof. The third lateral surface member 125 may be electrically connected to the connection member 103.

According to an embodiment, a second end of the first portion 111 and a fourth end of the second portion 121 may be electrically connected to a conductive area of the connection member 103. For example, the second end of the first portion 111, the connection member 103 (or a conductive area of the connection member 103), and the fourth end of the second portion may be electrically connected to each other.

According to an embodiment, the first lateral surface member 115 may be electrically connected to a first feeding line 1133 at a first point 113. At least a part of the first lateral surface member 115 may operate as a radiator of a first antenna. For example, a wireless communication circuit (not shown) may be electrically connected to the first feeding line 1133, and may supply power to the first point 113 of the first lateral surface member 115 via the first feeding line 1133. In an embodiment, a capacitor 1131 having a designated capacitance value may be disposed on the first feeding line 1133 electrically connected to the first point 113.

According to an embodiment, the first lateral surface member 115 may be selectively connected to a ground included in the first housing 101 by using a first switch 114 at a second point 1141. For example, the ground may include a ground of a printed circuit board included in the first housing 101 or the first support member 118 disposed on the first housing 101. In an embodiment, the second point 1141 may be located between the first point 113 and the connection member 103. In an example, a frequency band in which the total radiation efficiency of the first antenna reaches maximum may change according to the switching of the first switch 114. For example, the electronic device 100 may change a frequency band capable of transmitting and/or receiving by controlling and switching the first switch 114 from an open state to a short-circuited state. For another example, the electronic device 100 may change a frequency band capable of transmitting and/or receiving by changing the value of an element included in the first switch 114.

According to an embodiment, the third lateral surface member 125 may be selectively connected to a ground included in the second housing 102 by using a second switch 123 at a third point 1231. For example, the ground may include a ground of a printed circuit board included in the second housing 102 or the second support member 128 disposed on the second housing 102. In an example, the current flow may be controlled according to the switching of the second switch 123, and thus the radiation efficiency of the first antenna may be changed.

According to an embodiment, the second housing 102 may include a fifth lateral surface member 135 and/or a third insulation member 132. In an example, the second support member 128 may be integrally formed with or be formed to be coupled to the fifth lateral surface member 135. For example, a third portion 131 of a third edge 130 may include at least a part of the fifth lateral surface member 135, the third insulation member 132, or at least a part of the second support member 128. In an embodiment, the third edge 130 may have a third length shorter than the second length of the second edge 120 and may extend from one end of the second edge 120.

According to an embodiment, the third edge 130 of the second housing 102 may include the third portion 131. For example, the electronic device 100 may transmit a signal to an external device in a designated frequency band via the fifth lateral surface member 135 and receive a signal transmitted by an external device in a designated frequency band.

According to an embodiment, the third portion 131 may include a conductive material. The third insulation members 132 may be arranged at opposite ends of the fifth lateral surface member 135. For example, the third insulation member 132 may be disposed between the fifth lateral surface member 135 and the fourth lateral surface member 126.

According to an embodiment, the fifth lateral surface member 135 may be supplied with power from a fourth point 133. In an example, the wireless communication circuit (not shown) may be supplied with power from the fourth point 133 of the fifth lateral surface member 135, and thus at least a part of the fifth lateral surface member 135 may form the current flow so as to be operatable as an antenna radiator.

According to an embodiment, a fifth point 1341 of the fifth lateral surface member 135 may be selectively connected to a ground included in the second housing 102 by using a third switch 134. For example, the ground may include a ground of a printed circuit board included in the second housing 102 or the second support member 128 disposed on the second housing 102. In an example, a frequency band in which the radiation efficiency of a signal transmitted and/or received by the fifth lateral surface member 135 reaches maximum may change according to the switching of the third switch 134.

According to an embodiment, the first housing 101 may include a fourth edge having a length smaller than the first length of the first edge 110 and extending from one end of the first edge 110. In an embodiment, the description on the third edge 130 of the second housing 102 may be substantially identically applied to the fourth edge of the first housing 101.

Figure 2B:
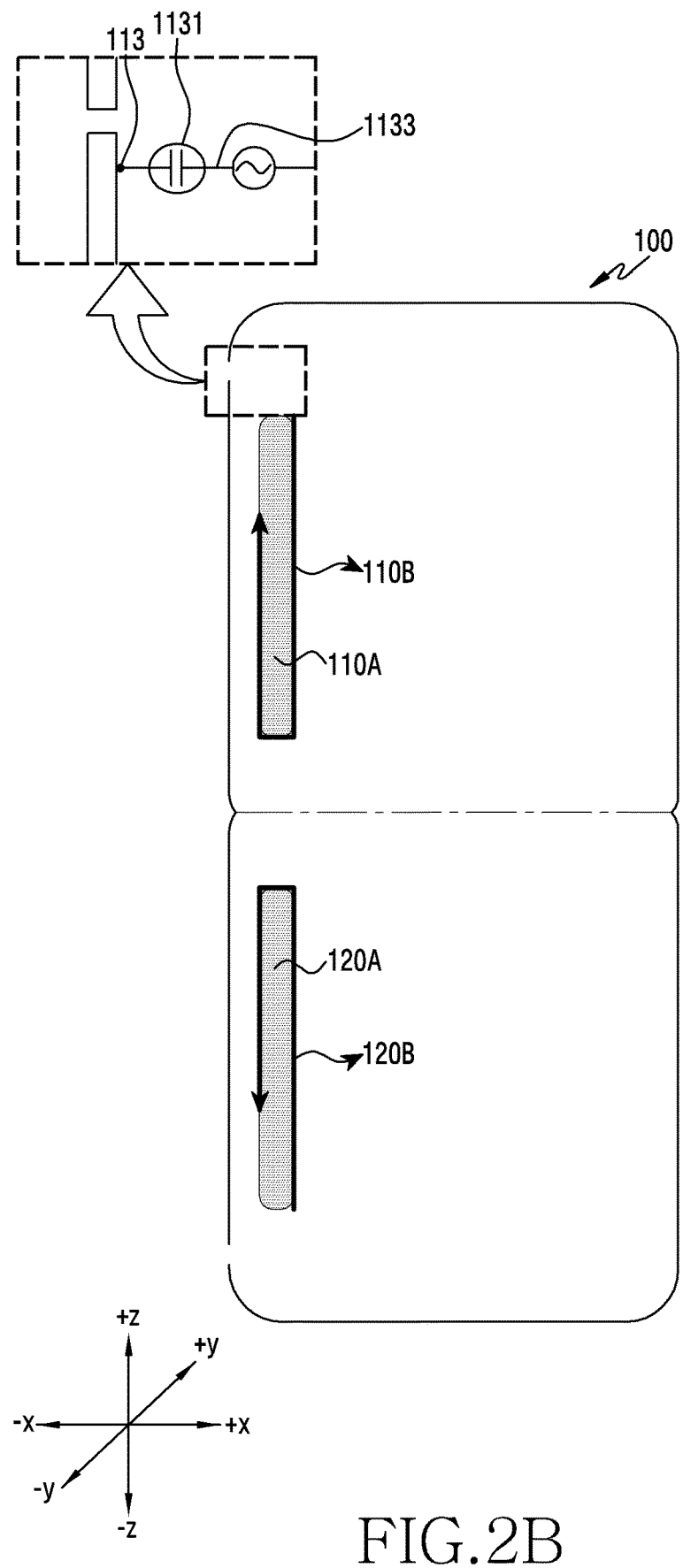
FIG. 2B illustrates an operation principle of an antenna of an electronic device according to an embodiment of the disclosure.

FIG. 2B shows an operation principle of an antenna of an electronic device 100 according to an embodiment of the disclosure.

Referring to FIG. 2B, the electronic device 100 according to various embodiments may form a first current flow 110B and a second current flow 120B by supplying power to the first lateral surface member 115 of the first housing 101 via the first point 113.

According to an embodiment, the capacitor 1131 having a designated value may be disposed in the first feeding line 1133. For example, the capacitor 1131 having a value of 10 pF or less may be disposed in the first feeding line 1133.

According to an embodiment, the first housing 101 may include the first opening 110A, and the second housing 102 may include the second opening 120A. In an embodiment, the first opening 110A or the second opening 120A may be filled with a non-conductive material. In an embodiment, the first opening 110A or the second opening 120A may have an opening shape in which a non-conductive material is not filled. In an embodiment, when the electronic device 100 is in a folded state and viewed from one surface (e.g., a rear surface of the electronic device 100) of the electronic device 100, at least a part of the first opening 110A may overlap the second opening 120A. For example, the first opening 110A may be formed through the first support member 118 which is a ground of the first antenna. For another example, the second opening 120A may be formed through the second support member 128.

According to an embodiment, the capacitor 1131 may play a role of indirectly supplying power to the first lateral surface member 115. According to an embodiment, the current supplied to the first lateral surface member 115 via the first point 113 may not flow to the first edge 110 of the electronic device 100 due to the capacitor 1131 having a designated value (e.g., a designated value of 10 pF or less), and may flow in a form of surrounding the first opening 110A like the first current flow 110B. For example, a part of the current supplied to the electronic device 100 via the first point 113 in the −x direction may flow in the +x direction due to the capacitor 1131 having a designated value, flow in the −z direction at one end of the first opening 110A, flow in the −x direction at another end of the first opening 110A, and flow in the +z direction at still another end of the first opening 110A. For example, the first current flow 110B may flow along the first opening 110A in a clockwise direction based on FIG. 2B.

According to an embodiment, current may be supplied to the first lateral surface member 115 via the first point 113, and thus the current may flow in a form of surrounding the second opening 120A like the second current flow 120B which is different from the first current flow 110B. For example, current flowing in the +z direction at one end of the second opening 120A may flow in the −x direction at another end of the second opening 120A, and flow in the −z direction at still another end of the second opening 120A. For example, the second current flow 120B may flow along the second opening 120A in a counterclockwise direction based on FIG. 2B.

According to an embodiment, in this way, the capacitor 1131 may be placed at a feeding point (e.g., the first point 113), the first opening 110A and the second opening 120A are placed, and thus when the electronic device 100 is in a folded state and viewed from one surface (e.g., a rear surface of the electronic device 100) of the electronic device 100, current flows in the same direction may be induced at the first edge 110 and the second edge 120 which overlap each other.

For example, a sum of the first length of the first edge 110 and the second length of the second edge 120 may be greater than or equal to 150 mm.

Figure 3:
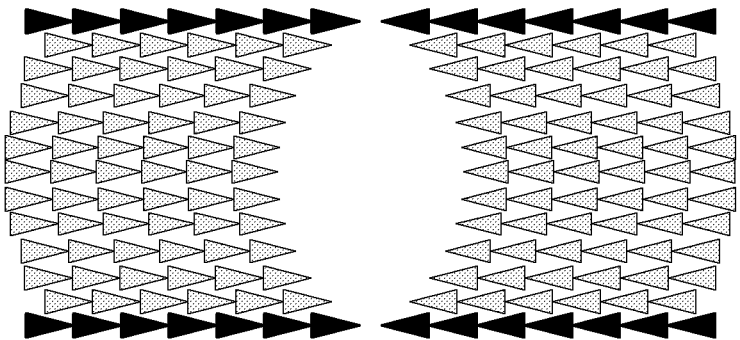
FIG. 3 illustrates various modes in which the current flows may be arranged according to an embodiment of the disclosure.
Figure 3:
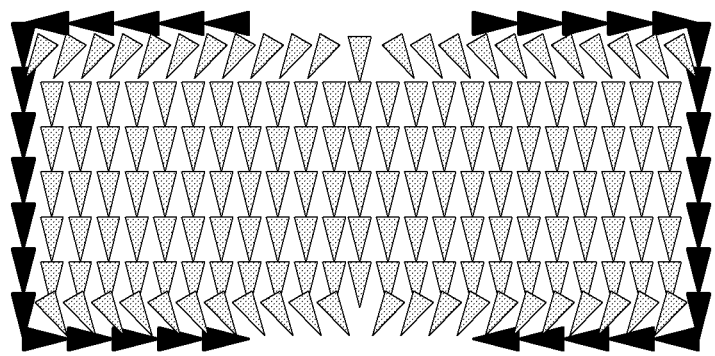
Figure 3:
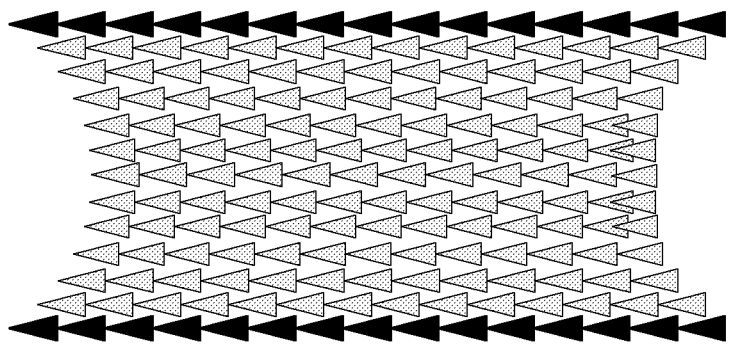

FIG. 3 shows various modes ($J_1$ mode, $J_2$ mode, or $J_4$ mode) in which the current flows may be arranged according to an embodiment of the disclosure.

Referring to FIG. 3, the current flow formed in the electronic device 100 may include a $J_1$ mode 310, a $J_2$ mode 320, or a $J_4$ mode 330.

According to an embodiment, the $J_1$ mode 310 may correspond to a current mode in which current flows in a direction parallel to one of the width and length of the electronic device 100, which is longer than the other. In an example, when the electronic device 100 is in an unfolded state (e.g., the electronic device 100 of FIG. 1A), the current flow of the $J_1$ mode 310 may be formed large, compared to other current modes. In another example, even when the electronic device 100 is in an unfolded state, another current mode may be formed to be superior to the $J_1$ mode 310. For example, the electronic device 100 may control the second switch 123 to allow the $J_1$ mode 310 to be superior or allow the $J_4$ mode 330 to be superior. For example, when the electronic device 100 is in an unfolded state, the electronic device 100 may short-circuit the second switch 123 to allow the J1 mode 310 to be superior.

According to an embodiment, the $J_2$ mode 320 may correspond to a current mode in which a current flow is aligned in one direction in a direction in which a length is shorter among the width and length of the electronic device 100. In an example, the current flow of the $J_1$ mode 310 or the $J_4$ mode 330 may be formed to be superior to that of the $J_2$ mode 320 in the electronic device 100.

According to an embodiment, the $J_4$ mode 330 may correspond to a current mode in which flows of currents converging from both directions to the center (e.g., the connection member 103) are aligned along a direction in which a length is longer among the width and length of the electronic device 100. In an example, when the electronic device 100 is in a folded state (e.g., the electronic device 100 of FIG. 1B), the current flow of the $J_4$ mode 330 may be formed larger, compared to other current modes. For example, when the electronic device 100 is in a folded state, the current flow of the $J_4$ mode 330 may be formed to be superior, and thus current flows in the same direction as each other may be formed in the first housing 101 and the second housing 102. In another example, even when the electronic device 100 is in a folded state, a current mode other than the $J_4$ mode 330 may be formed to be superior.

Figure 4:
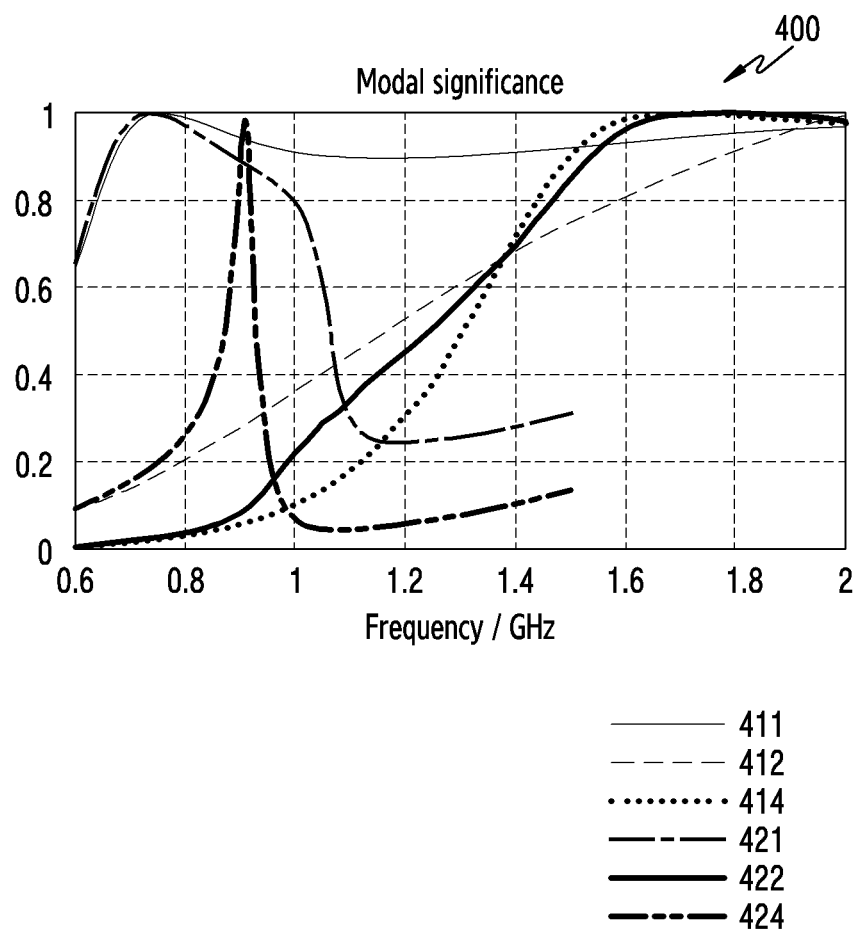
FIG. 4 illustrates modal significances of an electronic device in various frequency bands according to an embodiment of the disclosure.

FIG. 4 shows modal significance graphs 400 of an electronic device 100 in various frequency bands according to an embodiment of the disclosure.

Referring to FIG. 4, when the electronic device 100 has current modes different from each other, a frequency band in which a modal significance is maximized may be formed differently.

According to an embodiment, a modal significance graph 421 in the $J_1$ mode 310 of the electronic device 100 may have a maximum value in a frequency band between about 0.6 gigahertz (GHz) and about 0.8 GHz, and the frequency band may have a value lower than that of a frequency band in which a modal significance graph 411 of the electronic device according to the comparative example in the $J_1$ mode 310 has a maximum value. In an example, when the current flow of the $J_1$ mode 310 is formed to be superior to other current flows in an unfolded state of the electronic device 100, the antenna radiation efficiency may be improved in a frequency band between about 0.6 GHz and about 0.8 GHz. For example, in an electronic device according to a comparative example, the distance between a first switch (e.g., the first switch 114 of FIG. 2A) and a point where power is supplied to a first lateral surface member (e.g., the first lateral surface member 115 of FIG. 2A) is shorter than that in the electronic device 100 according to an embodiment of the disclosure, and power may be directly supplied to the first lateral surface member without passing through a capacitor (e.g., the capacitor 1131 of FIG. 2B).

According to an embodiment, a modal significance graph 422 in the $J_2$ mode 320 of the electronic device 100 may have a maximum value in a frequency band between about 1.6 GHz and about 1.8 GHZ, and the frequency band may have a value lower than that of a frequency band in which a modal significance graph 412 of the electronic device according to the comparative example in the $J_2$ mode 320 has a maximum value. In an example, when the current flow of the $J_2$ mode 320 is formed to be superior to other current flows in an unfolded state of the electronic device 100, the antenna radiation efficiency may be improved in a frequency band between about 1.6 GHz and about 1.8 GHZ.

A modal significance graph 424 in the $J_4$ mode 330 of the electronic device 100 according to an embodiment of the disclosure may have a maximum value in a frequency band between about 0.8 GHz and about 1.0 GHz, and the frequency band may have a value lower than that of a frequency band in which a modal significance graph 414 of the electronic device according to the comparative example in the $J_4$ mode 330 has a maximum value. For example, the electronic device according to the comparative example has had difficulties in successfully receiving signals in the low frequency band (LB) in the $J_4$ mode, but the electronic device 100 according to an embodiment may transmit and/or receive low-frequency signals with high efficiency even in the $J_4$ mode by reducing the decrease in efficiency according to the current direction or increasing the efficiency in the $J_4$ mode.

Figure 5A:
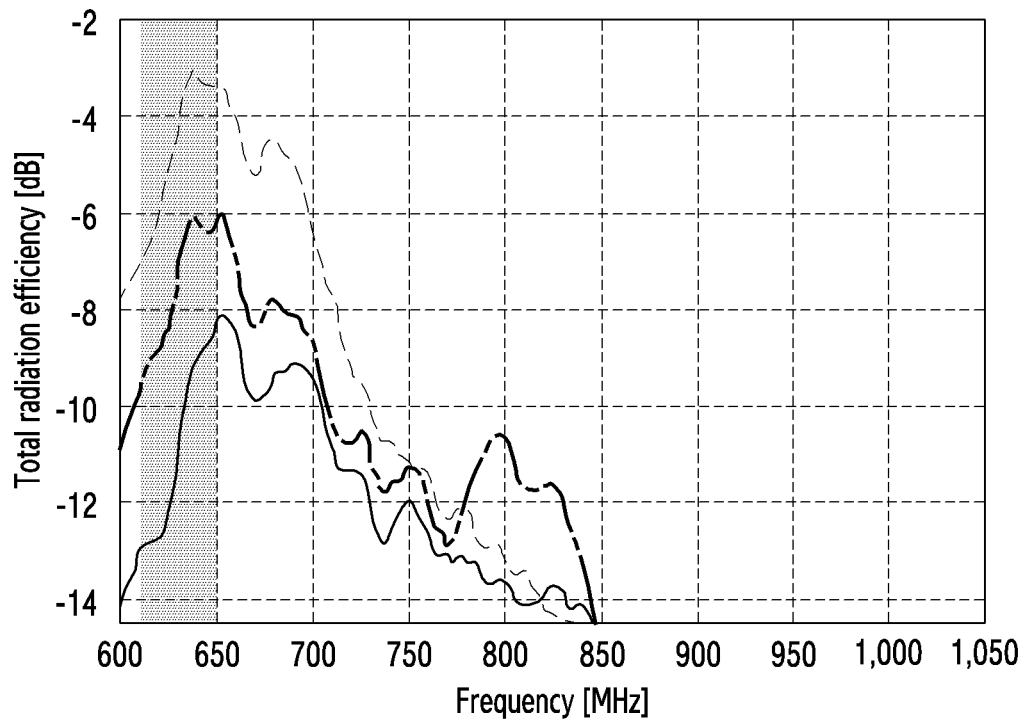
FIG. 5A illustrates a total radiation efficiency graph of an antenna according to the switching of a second switch when a first switch of an electronic device is in an open state according to an embodiment of the disclosure.

FIG. 5A shows a total radiation efficiency graph of an antenna according to the switching of a second switch 123 when a first switch 114 of an electronic device 100 is in an open state according to an embodiment of the disclosure.

Referring to FIG. 5A, when the first switch 114 is opened, the total radiation efficiency of an antenna (e.g., the first antenna of FIG. 2A) may change according to the switching of the second switch 123.

According to an embodiment, when the electronic device 100 is in an unfolded state, the first switch 114 is opened, and a total radiation efficiency graph 511 of an antenna in a state where the second switch 123 is removed or opened may have efficiency of −3 dB between about 600 MHz and about 650 MHz. According to another embodiment, when the electronic device 100 is in a folded state, the first switch 114 is opened, and a total radiation efficiency graph 512 of an antenna in a state where the second switch 123 is removed or opened may have efficiency of about −8 dB between about 600 MHz and about 650 MHz. According to still another embodiment, when the electronic device 100 is in a folded state, the first switch 114 is opened, a total radiation efficiency graph 513 of an antenna in a state where the second switch 123 is connected to a capacitor having a value of about 0.5 pF may have radiation efficiency of about −6 dB between about 600 MHz and about 650 MHZ.

Comparing the graph 511 with the graph 512, in an embodiment in which the first switch 114 is opened and the second switch 123 is removed or opened, total radiation efficiency of the electronic device 100 may be measured to be relatively lower in a folded state than in an unfolded state of the electronic device 100.

Comparing the graph 512 and the graph 513, the increase of radiation efficiency may be identified in a case where the third lateral surface member 125 of the second housing 102 and the conductive area (e.g., the second support member 128) of the second housing 102 are connected via a capacitor via the second switch 123, compared to a case (e.g., a state where a portion corresponding to the second switch is electrically opened) where the second switch 123 is removed. For example, the electronic device 100 may connect the second switch 123 to a capacitor having a designated value, and thus total radiation efficiency of an antenna may be improved in a frequency band between about 600 MHz and about 650 MHz in a folded state of the electronic device 100. For example, a capacitor may be positioned on an electrical path between the second switch 123 and the second support member 128. In an example, the total radiation efficiency of an antenna in a state where when the electronic device 100 is in a folded state, the first switch 114 is opened and the second switch 123 is connected to a ground via a capacitor having a value of about 1.5 pF may be improved, compared to the total radiation efficiency of an antenna in a state where when the electronic device 100 is in a folded state, the first switch 114 is opened and the second switch 123 is removed or opened.

Figure 5B:
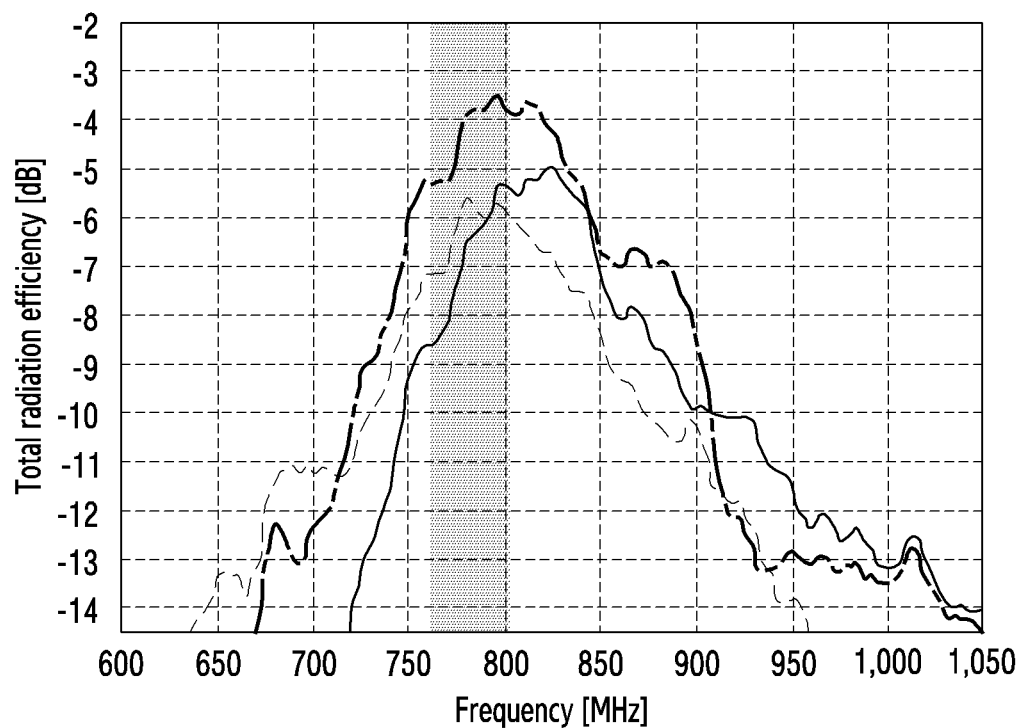
FIG. 5B illustrates a total radiation efficiency graph of an antenna according to the switching of a first switch in case that the first switch of an electronic device is connected to a ground via an inductor having a constant value according to an embodiment of the disclosure.

FIG. 5B shows a total radiation efficiency graph of an antenna according to the switching of a second switch 123 when the first switch 114 of an electronic device 100 is connected to a ground via an inductor having a designated value according to an embodiment of the disclosure.

Referring to FIG. 5B, when the first switch 114 is connected to a ground via an inductor having a designated value, total radiation efficiency of an antenna (e.g., the first antenna of FIG. 2A) may change according to the switching of the second switch 123.

According to an embodiment, when the electronic device 100 is in an unfolded state, the first switch 114 may be connected to a ground via an inductor having a value of about 12 nH, and a total radiation efficiency graph 521 of an antenna in a state where the second switch 123 is removed or opened may have radiation efficiency of about −5.8 dB in a frequency band between about 750 MHz and about 800 MHZ. For example, the inductor may be positioned on an electrical path between the first switch 114 and the first support member 118. According to another embodiment, when the electronic device 100 is in a folded state, the first switch 114 may be connected to a ground via an inductor having a value of about 12 nH, a total radiation efficiency graph 522 of an antenna in a state where the second switch 123 is removed or opened may have radiation efficiency of about −5.2 dB in a frequency band between about 750 MHZ and about 800 MHZ. According to still another embodiment, when the electronic device 100 is in a folded state, the first switch 114 may be connected to a ground via an inductor having a value of about 12 nH, a total radiation efficiency graph 523 of an antenna in a state where the second switch 123 is connected to a capacitor having a value of about 0.5 pF may have radiation efficiency of about −3.5 dB in a frequency band between about 750 MHz and about 800 MHZ.

According to an embodiment, in a frequency band between about 750 MHz and about 800 MHZ, the first switch 114 may be connected to a ground via an inductor having a value of about 12 nH, and in a state where the second switch 123 is removed or opened, the total radiation efficiency of an antenna may be better in a case of a folded state of the electronic device 100 than in a case of an unfolded state of the electronic device 100. For example, when the first switch 114 is connected to a ground via an inductor having a value of about 12 nH and the second switch 123 is removed or opened, if the electronic device 100 changes from an unfolded state to a folded state, the total radiation efficiency of an antenna may increase in a frequency band between about 750 MHz and about 800 MHZ.

According to an embodiment, by connecting the second switch 123 to a capacitor having a designated value, the total radiation efficiency of an antenna may be improved when the electronic device 100 is in a folded state. In an example, considering a total radiation efficiency graph 523 of an antenna in a state where when the electronic device 100 is in a folded state, the first switch 114 is connected to a ground via an inductor having a value of about 12 nH and the second switch 123 is connected to a capacitor having a value of about 1.5 pF and a total radiation efficiency graph 522 of an antenna in a state where when the electronic device 100 is in a folded state, the first switch 114 is connected to a ground via an inductor having a value of about 12 nH and the second switch 123 is removed or opened, the total radiation efficiency of an antenna in a state where the first switch 114 is connected to a ground via an inductor having a value of about 12 nH and the second switch 123 is connected to a capacitor having a value of about 1.5 pF may be better. For example, in a state where the first switch 114 is connected to a ground via an inductor having a value of about 12 nH, in a case of changing from a state where the second switch 123 is removed or opened to a state where the second switch 123 is connected to a capacitor having a value of 1.5 pF, the total radiation efficiency of an antenna may increase in a frequency band between about 750 MHz and about 800 MHZ.

Referring to FIGS. 5A and 5B, in a case where the first switch 114 is connected to a ground via an inductor having a designated value than in a case of an opened state of the first switch 114, an electrical length of the current flow formed in the first lateral surface member 115 may be shorter, and thus a frequency band in which the total radiation efficiency of an antenna reaches maximum may increase. In an embodiment, when the first switch 114 is opened, the total radiation efficiency of an antenna may be maximum in a frequency band between about 600 MHz and about 650 MHz, and when the first switch 114 is connected to a ground via an inductor having a value of about 12 nH, the total radiation efficiency of an antenna may be maximum in a frequency band between 750 MHz and about 850 MHz. For example, in a state where when the electronic device 100 is in an unfolded state, the first switch 114 is opened and the second switch 123 is removed or opened, a maximum frequency band which a total radiation efficiency graph 511 of an antenna has may be between about 600 MHZ and about 650 MHZ, and in a state where when the electronic device 100 is in an unfolded state, the first switch 114 is connected to a ground via an inductor having a value of about 12 nH and the second switch 123 is removed or opened, a maximum frequency band which a total radiation efficiency graph 521 of an antenna has may be between about 750 MHZ and about 800 MHZ. According to an embodiment, the electronic device 100 may connect a ground to the first switch 114 via an inductor having a designated value, and thus may change a resonant frequency band of an antenna. For example, in a state where when the electronic device 100 is in an unfolded state, the first switch 114 is opened and the second switch 123 is removed or opened, a frequency band of an antenna may be between about 600 MHz and about 650 MHZ, but in a state where when the electronic device 100 is in an unfolded state, the first switch 114 is connected to a ground via an inductor having a value of about 12 nH and the second switch 123 is removed or opened, a frequency band of an antenna may be between about 750 MHz and 800 MHZ.

Figure 5C:
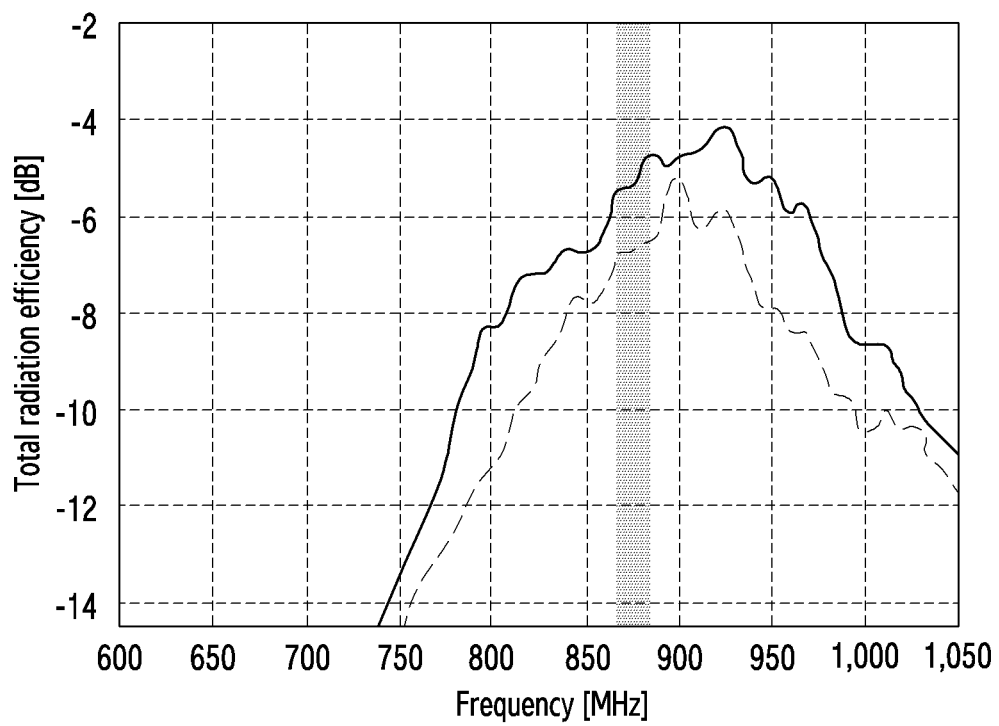
FIG. 5C illustrates a total radiation efficiency graph of an antenna in a folded state and an unfolded state of an electronic device when a first switch of the electronic device is connected to a ground via an inductor having a designated value according to an embodiment of the disclosure.

FIG. 5C shows a total radiation efficiency graph of an antenna in a folded state and an unfolded state of an electronic device when a first switch of the electronic device is connected to a ground via an inductor having a designated value according to an embodiment of the disclosure.

Referring to FIG. 5C, in a case where the first switch 114 is connected to a ground via an inductor having a designated value, when the electronic device 100 changes from an unfolded state to a folded state, the total radiation efficiency of an antenna (e.g., the first antenna of FIG. 2A) may increase.

According to an embodiment, in a case of an unfolded state of the electronic device 100, when the first switch 114 is connected to a ground via an inductor having a value of about 3.9 nH and the second switch 123 is removed or opened, a maximum value of a total radiation efficiency graph 531 of an antenna in a frequency band of about 860 MHz to about 880 MHz may be about −7 dB, and in a case of a folded state of the electronic device 100, when the first switch 114 is connected to a ground via an inductor having a value of about 3.9 nH and the second switch 123 is removed or opened, a maximum value of a total radiation efficiency graph 532 of an antenna in a frequency band of about 860 MHz to about 880 MHz may be about −5 dB.

According to another embodiment which is not shown in FIG. 5C, the total radiation efficiency of an antenna may increase more in a state where, in a folded state of the electronic device 100, the first switch 114 is connected to a ground via an inductor having a value of about 3.9 nH and the second switch 123 is removed or opened, than in a state where, in a folded state of the electronic device 100, the first switch 114 is connected to a ground via an inductor having a value of about 3.9 nH and the second switch 123 is connected to a capacitor having a designated value.

Figure 5D:
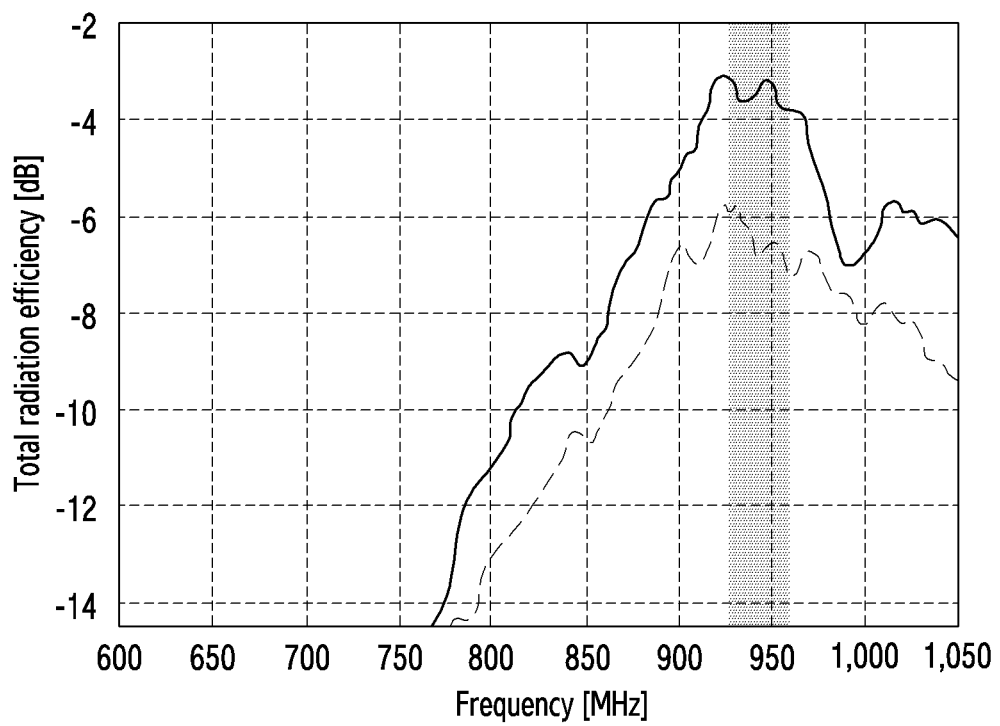
FIG. 5D illustrates a total radiation efficiency graph of an antenna in a folded state and an unfolded state of an electronic device when a first switch of the electronic device is connected to a ground via an inductor having a value different from the designated value of FIG. 5C according to an embodiment of the disclosure.

FIG. 5D shows a total radiation efficiency graph of an antenna in a folded state and an unfolded state of an electronic device 100 when a first switch 114 of the electronic device 100 is connected to a ground via an inductor having a value different from the designated value of FIG. 5C according to an embodiment of the disclosure.

Referring to FIG. 5D, in a case where the first switch 114 is connected to a ground via an inductor having a designated value, when the electronic device 100 changes from an unfolded state to a folded state, the total radiation efficiency of an antenna (e.g., the first antenna of FIG. 2A) may increase.

According to an embodiment, in a case of an unfolded state of the electronic device 100, when the first switch 114 is connected to a ground via an inductor having a value of about 2.2 nH and the second switch 123 is removed or opened, a maximum value of a total radiation efficiency graph 541 of an antenna in a frequency band of about 920 MHz to about 960 MHz may be about −6 dB, and in a case of a folded state of the electronic device 100, when the first switch 114 is connected to a ground via an inductor having a value of about 2.2 nH and the second switch 123 is removed or opened, a maximum value of a total radiation efficiency graph 542 of an antenna in a frequency band of about 920 MHz to about 960 MHz may be about −3.5 dB.

According to another embodiment which is not shown in FIG. 5D, the total radiation efficiency of an antenna may increase more in a state where, in a folded state of the electronic device 100, the first switch 114 is connected to a ground via an inductor having a value of about 2.2 nH and the second switch 123 is removed or opened, than in a state where, in a folded state of the electronic device 100, the first switch 114 is connected to a ground via an inductor having a value of about 2.2 nH and the second switch 123 is connected to a capacitor having a designated value.

Referring to FIGS. 5C and 5D, when the electronic device 100 is in an unfolded state, if the designated value of an inductor to which the first switch 114 is connected decreases, the frequency band in which a total radiation efficiency reaches maximum may increase. In an embodiment, in a state where, in an unfolded state of the electronic device 100, the first switch 114 is connected to a ground via an inductor having a value of about 3.9 nH and the second switch 123 is removed or opened, the total radiation efficiency of an antenna reaches maximum in a frequency band of about 900 MHZ, and in a state where, in an unfolded state of the electronic device 100, the first switch 114 is connected to a ground via an inductor having a value of about 2.2 nH and the second switch 123 is removed or opened, the total radiation efficiency of an antenna reaches maximum in a frequency band of about 925 MHZ.

According to an embodiment, when a designated value of an inductor to which the first switch 114 of the electronic device 100 is connected decreases, the maximum value of the total radiation efficiency graph of an antenna may increase. For example, in a state where, in an unfolded state of the electronic device 100, the first switch 114 is connected to a ground via an inductor having a value of 3.9 nH and the second switch 123 is removed or opened, a total radiation efficiency graph 531 may have a maximum value of about −4 dB, and in a state where, in an unfolded state of the electronic device 100, the first switch 114 is connected to a ground via an inductor having a value of about 2.2 nH and the second switch 123 is removed or opened, a total radiation efficiency graph 541 may have a maximum value of about −3.5 dB.

Figure 6A:
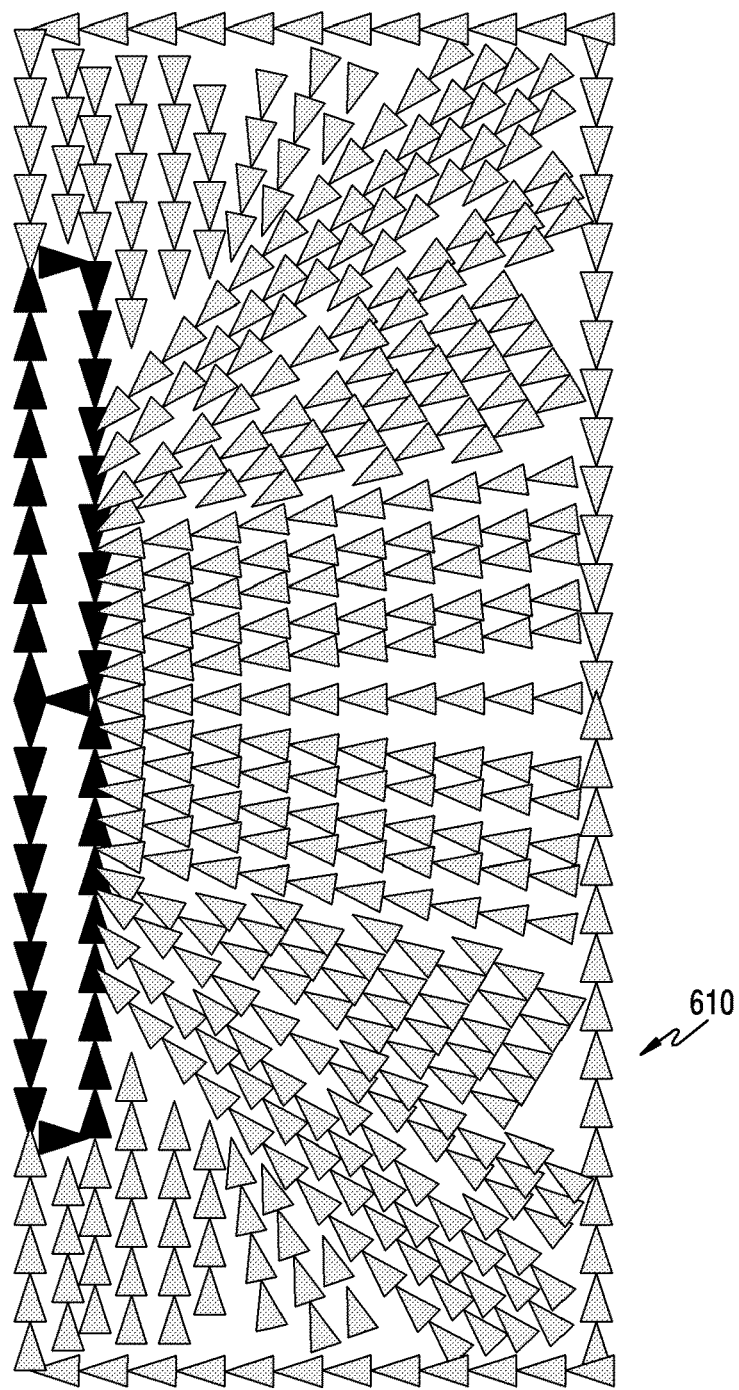
FIG. 6A illustrates current flow of an electronic device according to an embodiment of the disclosure.

FIG. 6A illustrates current flow 610 of an electronic device 100 according to an embodiment of the disclosure.

Referring to FIGS. 2B and 6A together, when the electronic device 100 is in an unfolded state, current may be collected toward a central portion (e.g., the connection member 103 of FIG. 2A) of the electronic device 100 in the current flow 610 in a state where the $J_4$ mode 330 is formed. As an example, the first current flow 110B and the second current flow 120B may face each other and be collected toward a central portion of the electronic device 100.

Figure 6B:
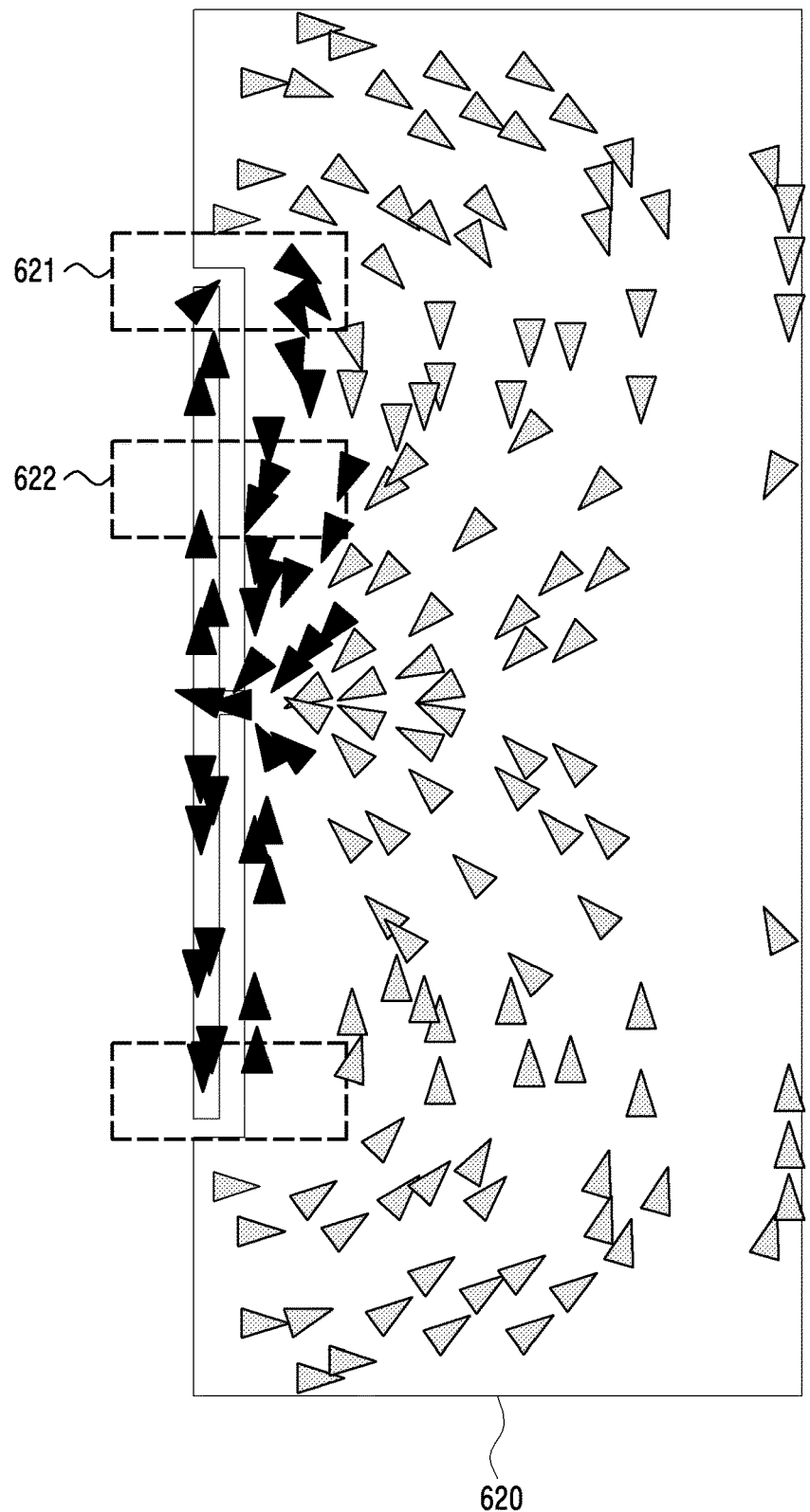
FIG. 6B illustrates current flow in case that a second switch of an electronic device is connected to a ground via an inductor having a designated value according to an embodiment of the disclosure.

FIG. 6B illustrates current flow 620 when a second switch 123 of an electronic device 100 is connected to a ground via an inductor having a designated value according to an embodiment of the disclosure.

Referring to FIGS. 2A and 6B together, when the second switch 123 is connected to a ground via an inductor having a designated value in an unfolded state of the electronic device 100, the current formed at a portion 621 where power is supplied may form a flow leading to the portion 621 where power is supplied again via a portion 622 where the second switch 123 is positioned. For example, when the second switch 123 is connected to a ground via an inductor having a value of about 2.2 nH, at least a part of the current formed at the portion 621 where power is supplied may flow to a center of the electronic device 100, and the remaining part may flow to the portion 621 where power is supplied again via the portion 622 where the second switch 123 is positioned.

Figure 6C:
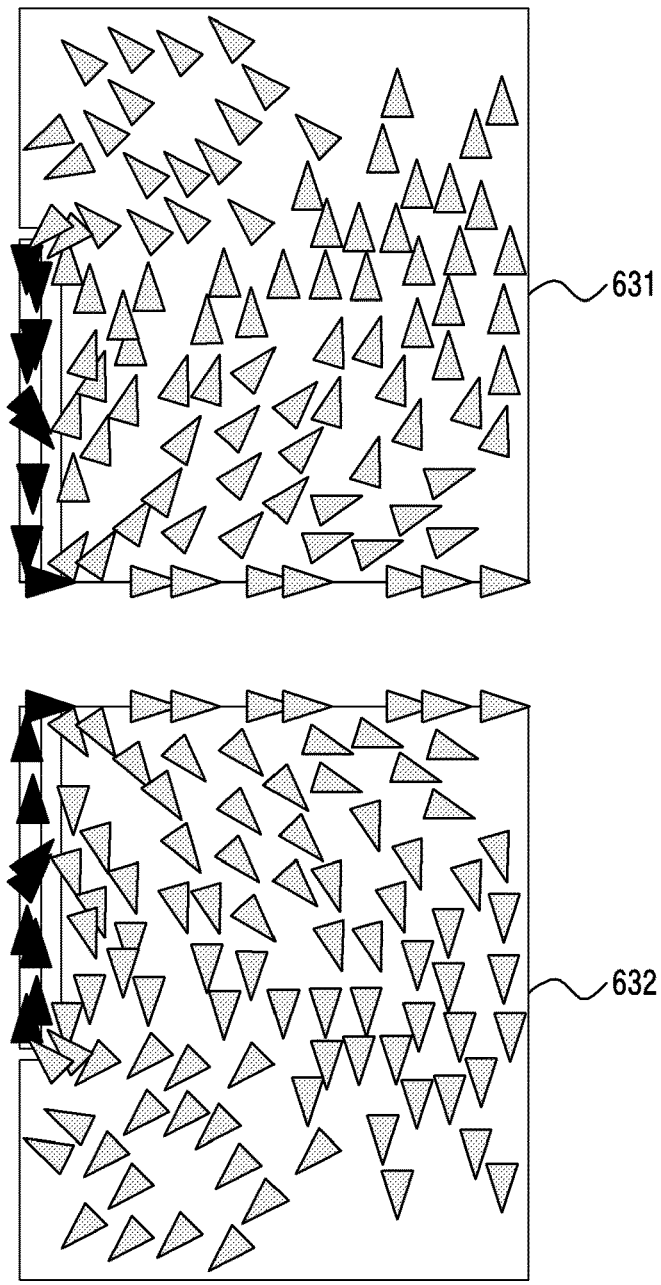
FIG. 6C illustrates current flow of a first housing and the current flow of a second housing when an electronic device is in a folded state according to an embodiment of the disclosure.

FIG. 6C illustrates current flow 631 of a first housing 101 and the current flow 632 of a second housing 102 when an electronic device 100 is in a folded state according to an embodiment of the disclosure.

Referring to FIGS. 2A and 6C together, when the electronic device 100 is in a folded state, the current flow 631 where the first current flow 110B is formed may be formed in the first housing 101, and the current flow 632 where the second current flow 120B is formed may be formed in the second housing 102. For example, when the electronic device 100 is in a folded state, the first current flow 110B and the second current flow 120B may form the current flow of the $J_4$ mode 330.

According to an embodiment, the first current flow 110B and the second current flow 120B may be formed to be symmetric to each other around the connection member 103. For example, in a folded state of the electronic device 100, the first current flow 110B and the second current flow 120B may form current flows in substantially the same direction.

Figure 7A:
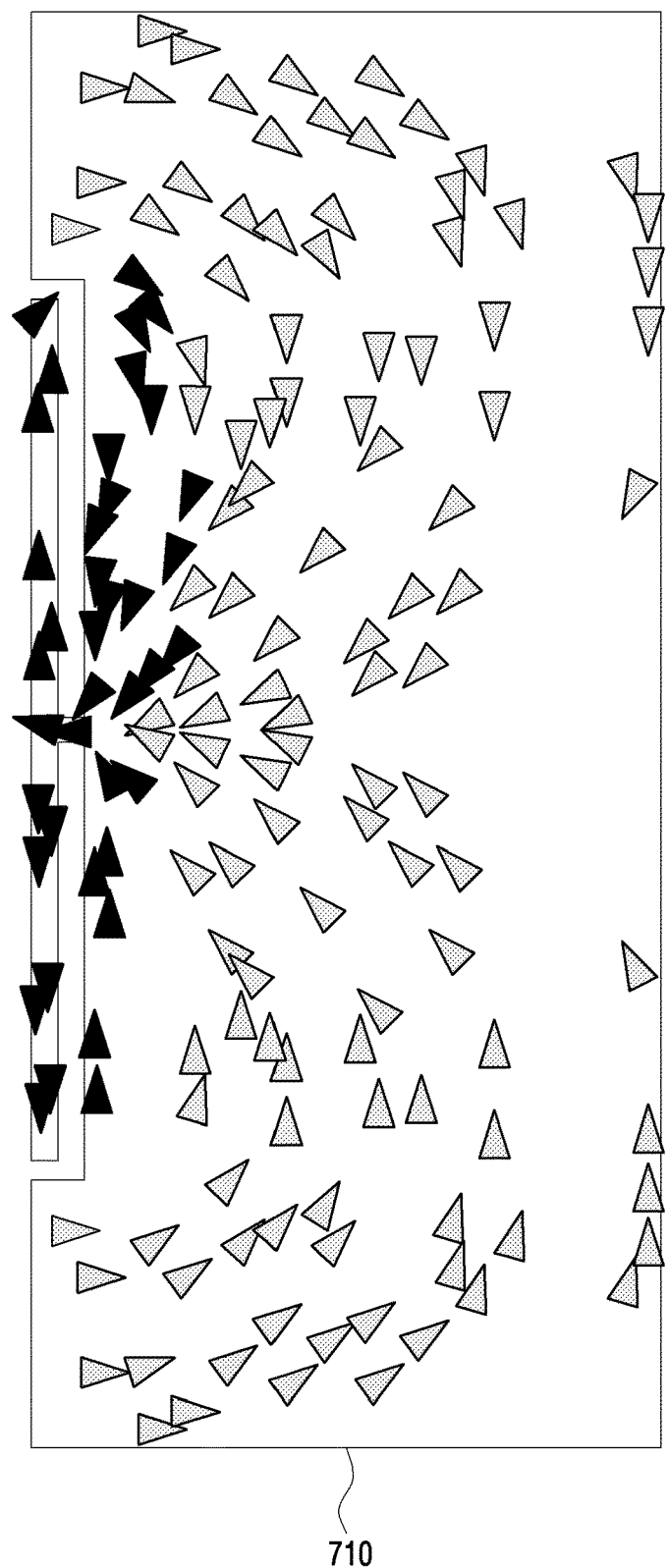
FIG. 7A illustrates the current flow when a second switch is open in an unfolded state of an electronic device according to an embodiment of the disclosure.

FIG. 7A illustrates the current flow 710 when a second switch 123 is open in an unfolded state of an electronic device 100 according to an embodiment of the disclosure.

Referring to FIGS. 2A, 2B, and 7A together, when the electronic device 100 is in an unfolded state, if the second switch 123 is opened, the current flow 710 in a state where the $J_4$ mode 330 is formed to be superior to other current modes may be formed. For example, in a state where the second switch 123 is opened, the first current flow 110B and the second current flow 120B may face each other and be collected toward a center of the electronic device 100.

Figure 7B:
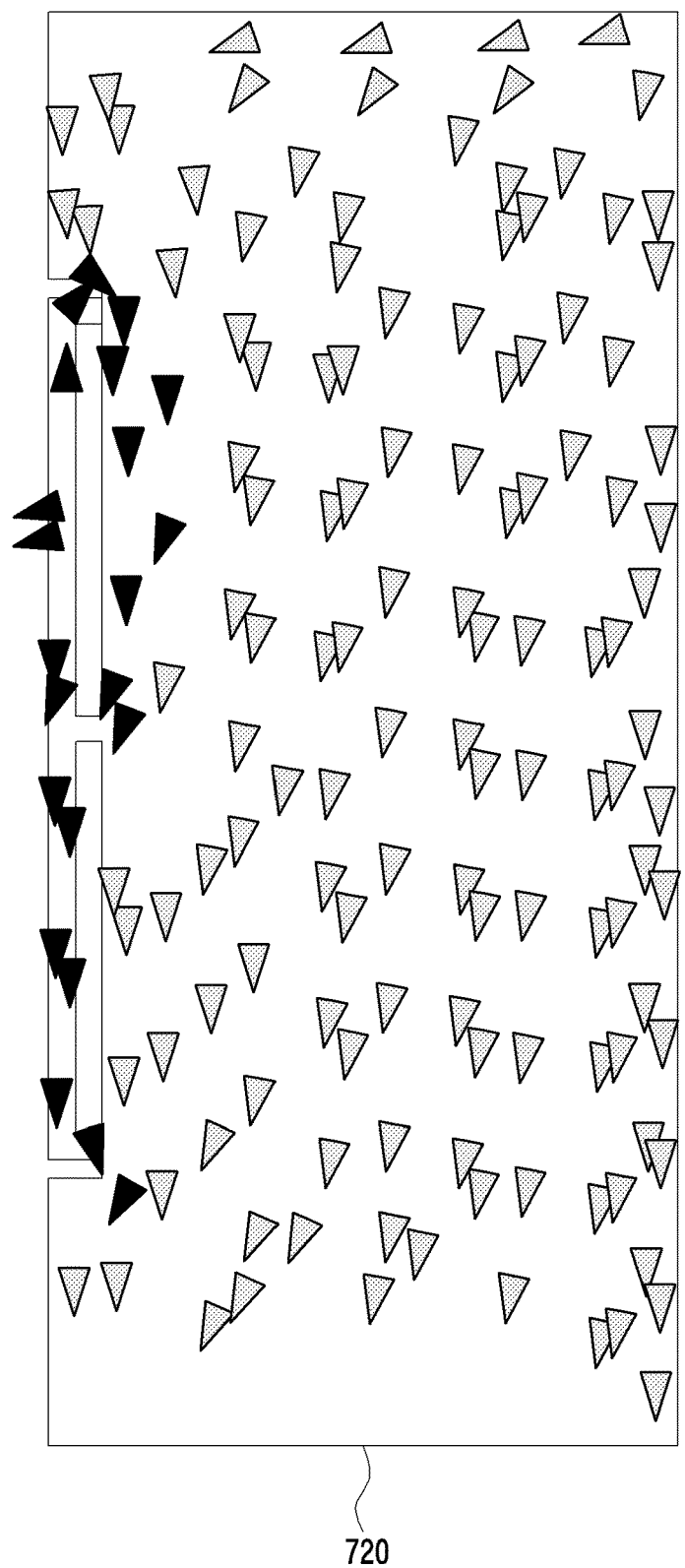
FIG. 7B illustrates the current flow when a second switch is short-circuited in an unfolded state of an electronic device according to an embodiment of the disclosure.

In an embodiment, another current mode (e.g., the $J_1$ mode 310 or the $J_2$ mode 320) may be partially formed besides the $J_4$ mode 330. FIG. 7B illustrates the current flow 720 when a second switch 123 is short-circuited in an unfolded state of an electronic device 100 according to an embodiment of the disclosure.

Referring to FIGS. 2A, 2B, and 7B together, when the electronic device 100 is in an unfolded state, if the second switch 123 is short-circuited, the current flow 720 in which the $J_4$ mode 330 is formed to be relatively weakened may be formed. Weakening of the $J_4$ mode may result in a relatively strong $J_1$ mode. For example, the electronic device 100 may enhance the $J_4$ mode to receive signals in the low frequency band in a folded state, and the electronic device 100 may weaken the $J_4$ mode and enhance the $J_1$ mode in an unfolded state to receive a signal in a low frequency band. According to an embodiment, for the control of the $J_1$ mode and $J_4$ mode, the electronic device 100 may change the opening/short-circuiting of the second switch 123 or the value of an element. For example, when the second switch 123 is short-circuited in an unfolded state of the electronic device 100, one current flow which substantially flows in one direction including the first portion 111 and the second portion 121 may be formed. In an embodiment, another current mode (e.g., the $J_2$ mode 320 or the $J_4$ mode 330) may be partially formed besides the $J_1$ mode 310.

Figure 7C:
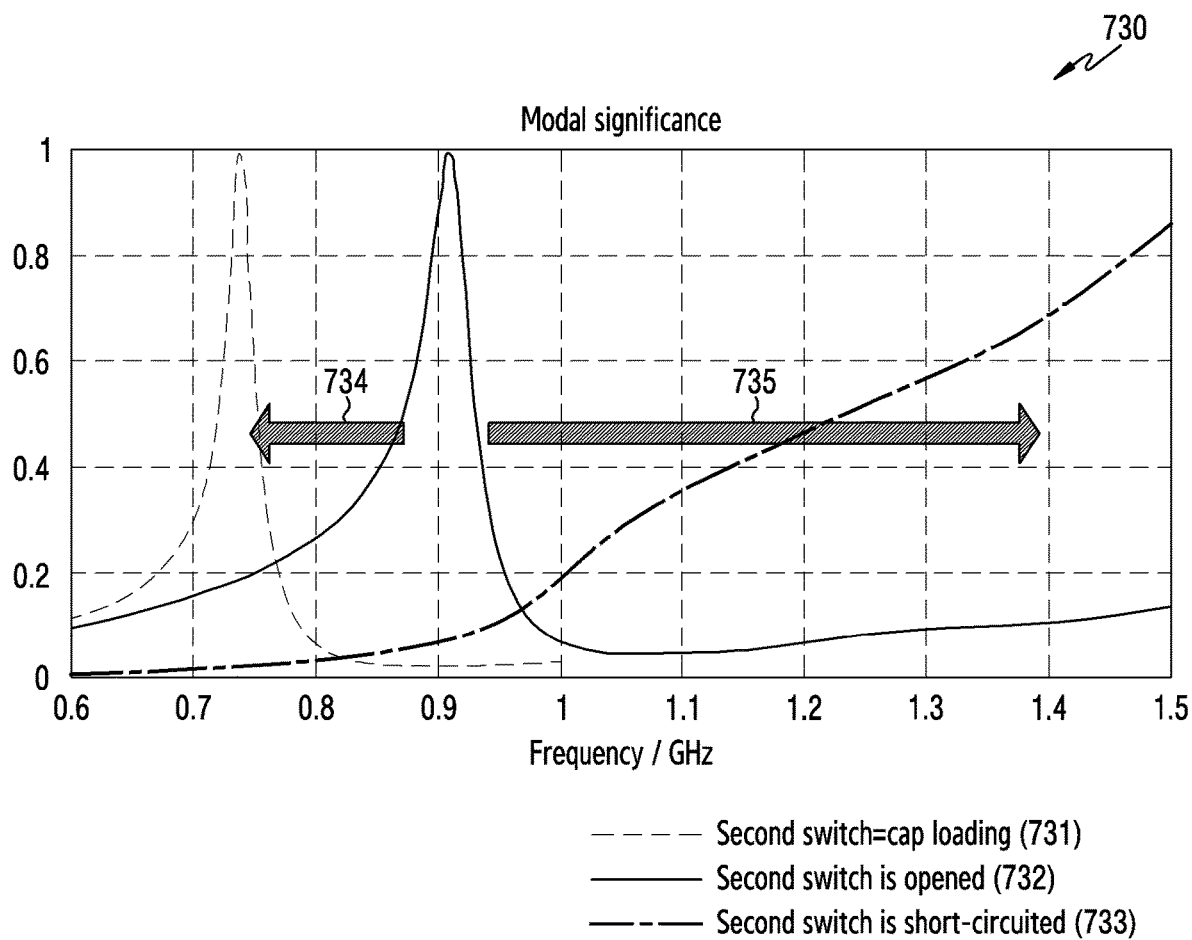
FIG. 7C illustrates a modal significance graph according to the switching of a second switch in an unfolded state of an electronic device according to an embodiment of the disclosure.

FIG. 7C shows a modal significance graph 730 of the $J_4$ mode 330 according to the switching of a second switch 123 in an unfolded state of an electronic device 100 according to an embodiment of the disclosure.

Referring to FIG. 7C, when the electronic device 100 is in an unfolded state, the current flow of the $J_4$ mode 330 may be formed to be superior to other current flows according to the switching state of the second switch 123.

In an embodiment, when the second switch 123 is opened, a modal significance graph 732 of the $J_4$ mode 330 may reach maximum in a frequency band of about 0.9 GHZ. In another embodiment, when the second switch 123 is short-circuited, a modal significance graph 733 of the $J_4$ mode 330 may reach maximum in a high frequency band of about 1.5 GHz or more. In another embodiment, when a capacitor having a designated value is connected to the second switch 123, a modal significance graph 731 of the $J_4$ mode 330 may reach maximum in a frequency band of about 0.75 GHZ.

According to an embodiment, when the second switch 123 is switched from an opened state to a state of being connected to a capacitor having a designated value, the change 734 of a modal significance graph of the $J_4$ mode 330 may appear as a frequency band being lowered.

According to an embodiment, when the second switch 123 is switched from an opened state to a short-circuited state, the current flow which is superior in a relatively low frequency band may be changed. For example, if the second switch 123 is switched from an opened state to a short-circuited state, like the change 735 of a modal significance graph of the $J_4$ mode 330, in a low frequency band of 1 GHz or less, the current flow of the $J_4$ mode 330 may be weakened and the current flow of the $J_1$ mode 310 may be relatively enhanced.

Figure 8:
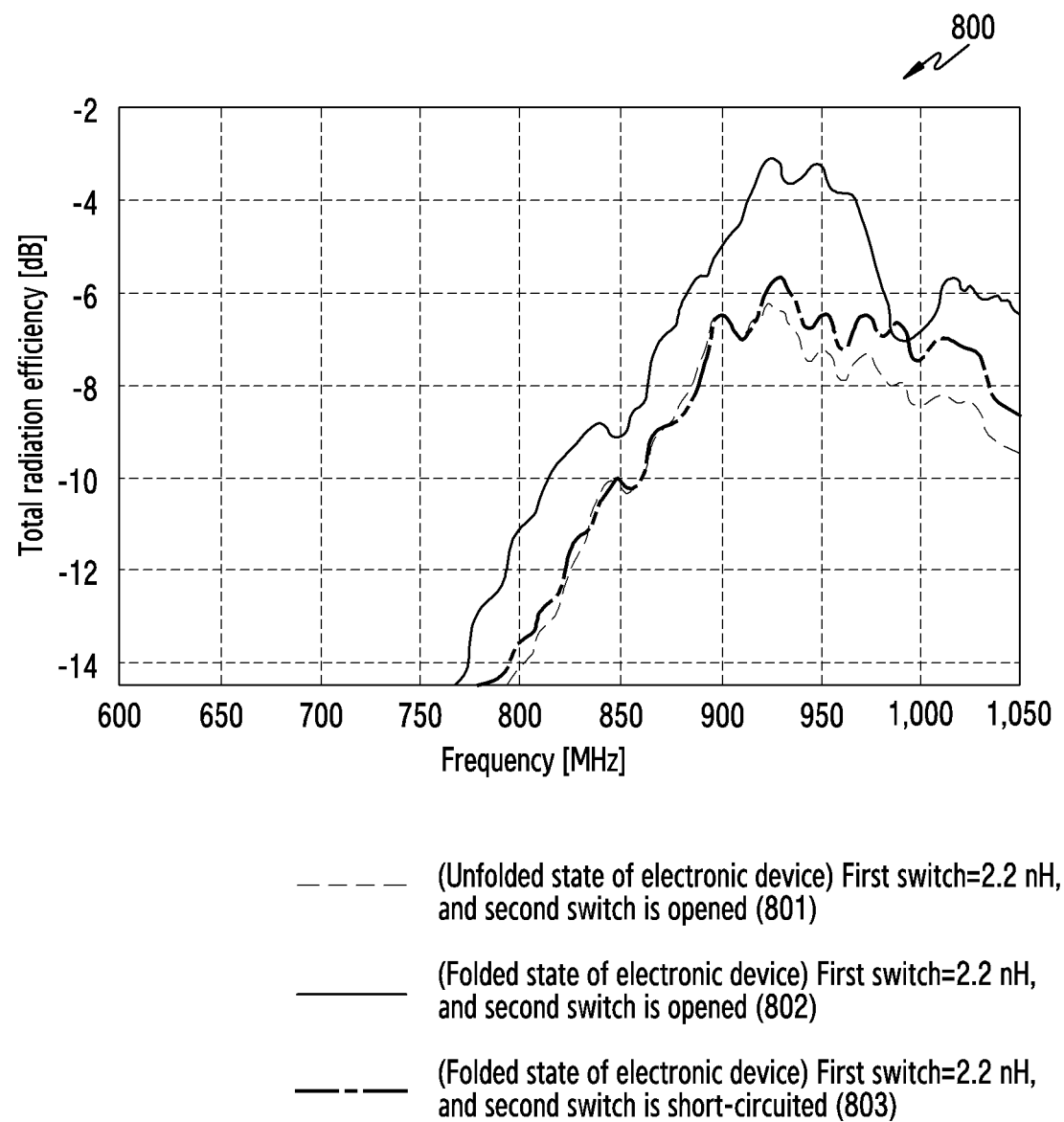
FIG. 8 illustrates a total radiation efficiency graph of an antenna according to the switching of a second switch when an electronic device in an unfolded state or a folded state according to an embodiment of the disclosure.

FIG. 8 shows a total radiation efficiency graph 800 of an antenna according to the switching of a second switch 123 when an electronic device 100 is in an unfolded state or a folded state according to an embodiment of the disclosure.

Referring to FIG. 8, when the first switch 114 is connected to a ground via an inductor having a designated value, the total radiation efficiency of an antenna may change according to the switching of the second switch 123.

According to an embodiment, in a state where the first switch 114 is connected to a ground via an inductor having a value of about 2.2 nH and the second switch 123 is opened in an unfolded state of the electronic device 100, a total radiation efficiency graph 801 of an antenna may have a maximum value of about −6.2 dB in a frequency band between about 900 MHz and about 950 MHz. According to another embodiment, in a state where the first switch 114 is connected to a ground via an inductor having a value of about 2.2 nH and the second switch 123 is opened in a folded state of the electronic device 100, a total radiation efficiency graph 802 of an antenna may have a maximum value of about −3 dB in a frequency band between 900 MHz and 950 MHz. According to still another embodiment, in a state where the first switch 114 is connected to a ground via an inductor having a value of about 2.2 nH and the second switch 123 is short-circuited in an unfolded state of the electronic device 100, a total radiation efficiency graph 803 of an antenna may have a maximum value of about −5.8 dB in a frequency band between about 900 MHz and about 950 MHZ.

According to an embodiment, when the electronic device 100 is in an unfolded state, by short-circuiting the second switch 123, the current flow of the $J_1$ mode 310 may be relatively enhanced, compared to the current flow of the $J_4$ mode 330. Accordingly, in an unfolded state of the electronic device 100, the total radiation efficiency of an antenna may be improved in a frequency band between about 900 MHZ and about 950 MHz in a case where the second switch 123 is short-circuited, compared to a case where the second switch 123 is opened. In an example, a total radiation efficiency graph 803 of an antenna in a state where the first switch 114 is connected to a ground via an inductor having a value of about 2.2 nH and the second switch 123 is short-circuited in an unfolded state of the electronic device 100 may have a better total radiation efficiency of an antenna in at least a part of frequency bands, compared to a total radiation efficiency graph 801 of an antenna in a state where the first switch 114 is connected to a ground via an inductor having a value of about 2.2 nH and the second switch is opened in an unfolded state of the electronic device 100. For example, when the first switch 114 is connected to a ground via an inductor having a value of about 2.2 nH and the second switch 123 is switched from an open state to a short-circuited state in an unfolded state of the electronic device 100, the total radiation efficiency of an antenna may increase from about −6.2 dB to about −5.8 dB.

Figure 9:
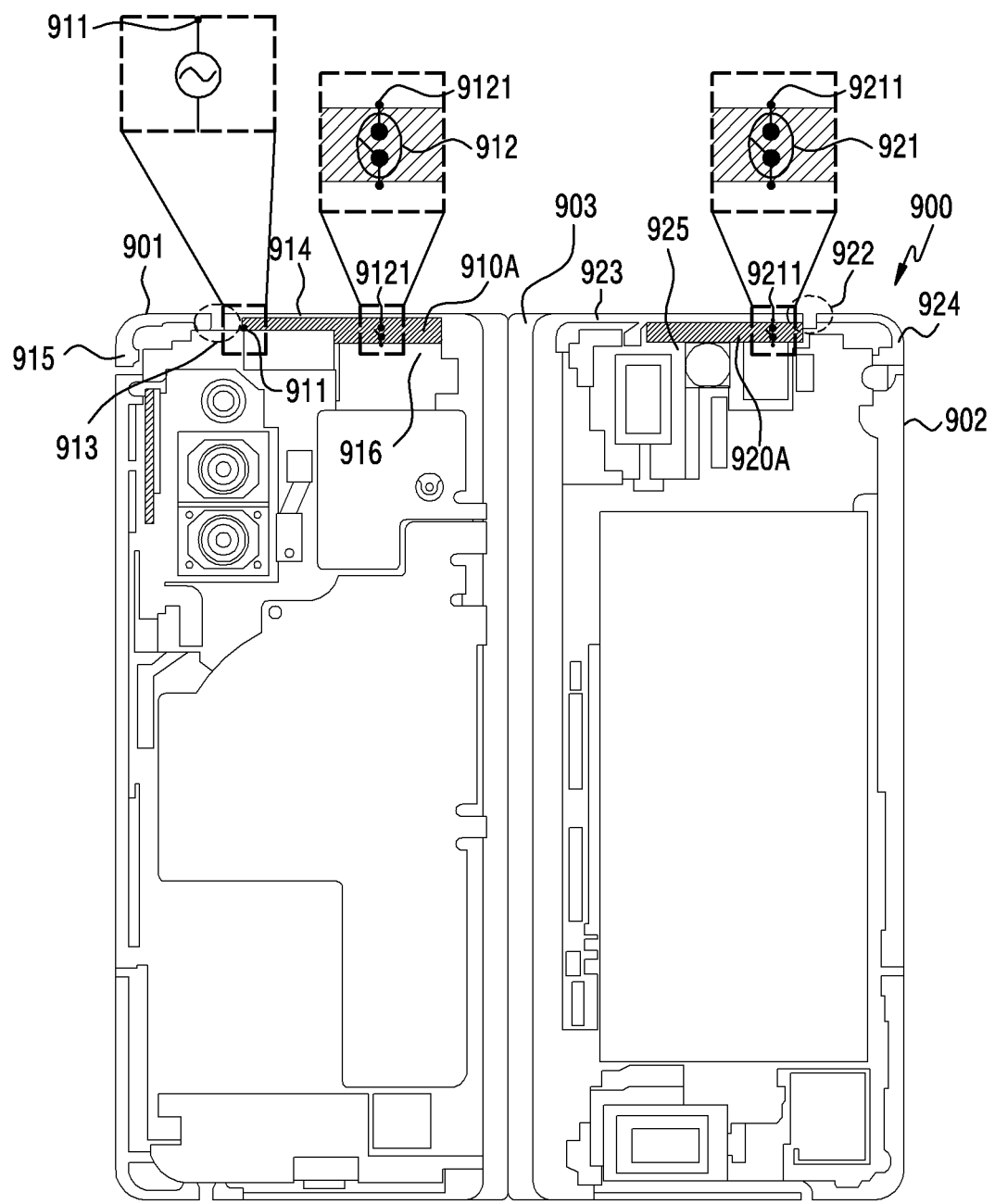
FIG. 9 illustrates an electronic device having a V-fold form according to an embodiment of the disclosure.

FIG. 9 illustrates an electronic device 900 having a V-fold form according to an embodiment of the disclosure. The description of the electronic device 100 of FIG. 2A may be described with reference to the description of FIG. 2A to the extent of not conflicting with or contradicting the characteristics of the electronic device 900.

Referring to FIG. 9, according to an embodiment, an electronic device 900 may include a first housing 901, a second housing 902, and a connection member 903 allowing the second housing to be rotatable with respect to the first housing 901.

According to an embodiment, the first housing 901 may include a first lateral surface member 914, a second lateral surface member 915, a first insulation member 913, and/or a first support member 916. In an embodiment, the first support member 916 may be integrally formed with or be formed to be coupled to the first lateral surface member 914 or the second lateral surface member 915. In an embodiment, a first opening 910A may be formed between the first lateral surface member 914 and the first support member 916.

According to an embodiment, the first lateral surface member 914, the second lateral surface member 915, or the first support member 916 may include a conductive material. The first insulation member 913 may be disposed between the first lateral surface member 914 and the second lateral surface member 915. The first lateral surface member 914 may be electrically connected to the connection member 903.

According to an embodiment, the second housing 902 may include a third lateral surface member 923, a fourth lateral surface member 924, a second insulation member 922, and/or a second support member 925. In an embodiment, the second support member 925 may be integrally formed with or be formed to be coupled to the third lateral surface member 923 or the fourth lateral surface member 924. In an embodiment, a second opening 920A may be formed between the third lateral surface member 923 and the second support member 925.

According to an embodiment, the third lateral surface member 923, the fourth lateral surface member 924 and/or the second support member 925 may include a conductive material. The second insulation member 922 may be disposed between the third lateral surface member 923 and the fourth lateral surface member 924.

According to an embodiment, the first lateral surface member 914, the second lateral surface member 915, the first support member 916, the third lateral surface member 923, the fourth lateral surface member 924 and/or the second support member 925 may include a conductive material such as copper (Cu), aluminum (Al), silver (Ag), tin (Sn), gold (Au), nickel (Ni), lead (Pb), titanium (Ti), or an alloy thereof.

According to an embodiment, the first lateral surface member 914 may be electrically connected to the third lateral surface member 923. For example, the first lateral surface member 914 and the third lateral surface member 923 may be electrically connected to each other via the connection member 903.

According to an embodiment, the first lateral surface member 914 may be electrically connected to a feeding line (not shown) at a first point 911. For example, a wireless communication circuit may supply power for the first lateral surface member 914 at the first point 911. A capacitor (e.g., the capacitor 1131 of FIG. 2B) having a designated value may be disposed at the feeding line electrically connected to the first point 911.

According to an embodiment, a second point 9121 of the first lateral surface member 914 may be electrically connected to a first switch 912. According to an embodiment, the first lateral surface member 914 may be selectively connected to the first support member 916 or a ground included in the first housing 901 by using the first switch 912 at the second point 9121. In an example, a frequency band in which the total radiation efficiency of an antenna reaches maximum may change according to the switching of the first switch 912.

According to an embodiment, the second opening 920A may be formed between the third lateral surface member 923 and the second support member 925. In an example, a third point 9211 of the third lateral surface member 923 may be electrically connected to a second switch 921. In an example, the total radiation efficiency of an antenna may change according to the switching of the second switch 921.

According to an embodiment, the electronic device 900 may include a wireless communication circuit. In an example, the wireless communication circuit included in the electronic device 900 may control the second switch 921 in a folded state of the electronic device 900 to electrically open the third point 9211 and a ground area of the electronic device 900.

According to an embodiment, the electronic device 900 may operate substantially similar to the electronic device 100 of FIGS. 2A and 2B. For example, the electronic device 900 may open the second switch 921 in a folded state of the electronic device 900 to form the current flow of the $J_4$ mode, short-circuit the second switch 921 in an unfolded state of the electronic device 900 to form the current flow of the $J_1$ mode, and thus transmit and/or receive signals of a designated frequency band (e.g., LB band) by using the first lateral surface member 914.

Figure 10:
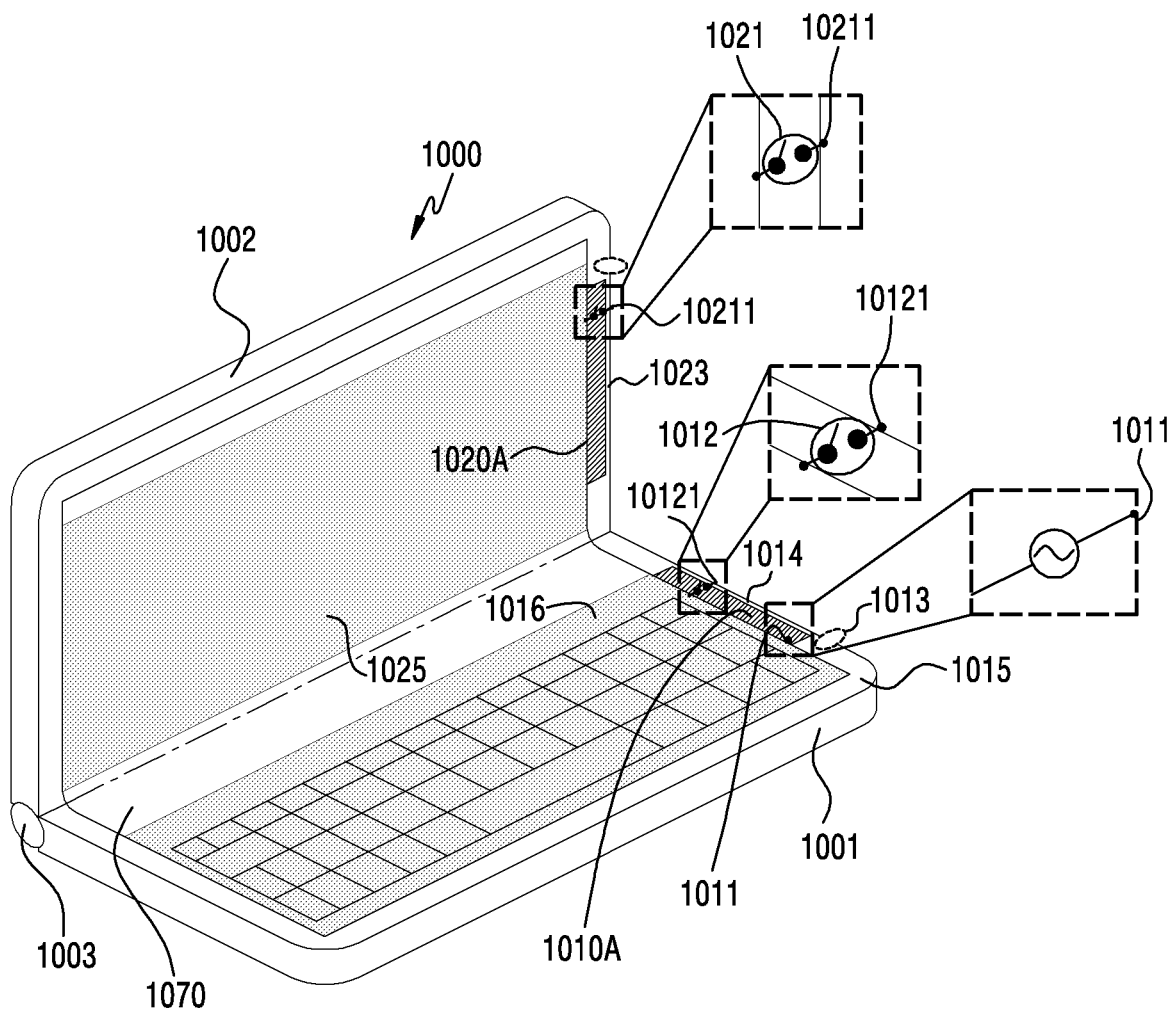
FIG. 10 illustrates an electronic device having a form of a laptop size according to an embodiment of the disclosure.

FIG. 10 illustrates an electronic device 1000 having a form of a laptop size according to an embodiment of the disclosure.

Referring to FIG. 10, an electronic device 1000 according to an embodiment may include a first housing 1001, a second housing 1002, a flexible display 1070, and/or a connection member 1003 allowing the second housing 1002 to be rotatable with respect to the first housing 1001.

According to an embodiment, the first housing 1001 may include a first lateral surface member 1014, a second lateral surface member 1015, a first insulation member 1013, and/or a first support member 1016. In an embodiment, the first support member 1016 may be integrally formed with or be formed to be coupled to the first lateral surface member 1014 or the second lateral surface member 1015. In an embodiment, a first opening 1010A may be formed between the first lateral surface member 1014 and the first support member 1016.

According to an embodiment, the first lateral surface member 1014, the second lateral surface member 1015, and/or the first support member 1016 may include a conductive material. The first insulation member 1013 may be disposed between the first lateral surface member 1014 and the second lateral surface member 1015. The first lateral surface member 1014 may be electrically connected to the connection member 1003. For example, the first lateral surface member 1014, the second lateral surface member 1015, and/or the first support member 1016 may include a conductive material such as copper (Cu), aluminum (Al), silver (Ag), tin (Sn), gold (Au), nickel (Ni), lead (Pb), titanium (Ti), or an alloy thereof.

According to an embodiment, the first lateral surface member 1014 and a third lateral surface member 1023 may be electrically connected to each other. For example, the first lateral surface member 1014 and the third lateral surface member 1023 may be electrically connected to each other via the connection member 1003.

According to an embodiment, the first lateral surface member 1014 may be electrically connected to a feeding line at a first point 1011. For example, a wireless communication circuit may supply power for the first lateral surface member 1014 at the first point 1011. A capacitor (e.g., the capacitor 1131 of FIG. 2B) having a designated value may be disposed at the feeding line electrically connected to the first point 1011.

According to an embodiment, a second point 10121 of the first lateral surface member 1014 may be electrically connected to a first switch 1012. According to an embodiment, the first lateral surface member 1014 may be selectively connected to the first support member 1016 or a ground included in the first housing 1001 by using the first switch 1012 at the second point 10121. In an example, a frequency band in which the total radiation efficiency of an antenna reaches maximum may change according to the switching of the first switch 1012.

According to an embodiment, a second opening 1020A may be formed between the third lateral surface member 1023 and a second support member 1025. In an example, a third point 10211 of the third lateral surface member 1023 may be electrically connected to a second switch 1021. In an example, the total radiation efficiency of an antenna may change according to the switching of the second switch 1021.

According to an embodiment, the electronic device 1000 may operate substantially similar to the electronic device 100 of FIGS. 2A and 2B. For example, the electronic device 1000 may open the second switch 1021 in a folded state of the electronic device 1000 to form the current flow of the $J_4$ mode, short-circuit the second switch 1021 in an unfolded state of the electronic device 1000 to form the current flow of the $J_1$ mode, and thus transmit and/or receive signals of a designated frequency band (e.g., LB band) by using the first lateral surface member 1014.

According to an embodiment, the first support member 1016 and/or the second support member 1025 may be disposed in an internal space of the electronic device 1000 formed by the flexible display 1070, the first housing 1001, and the second housing 1002.

Figure 11:
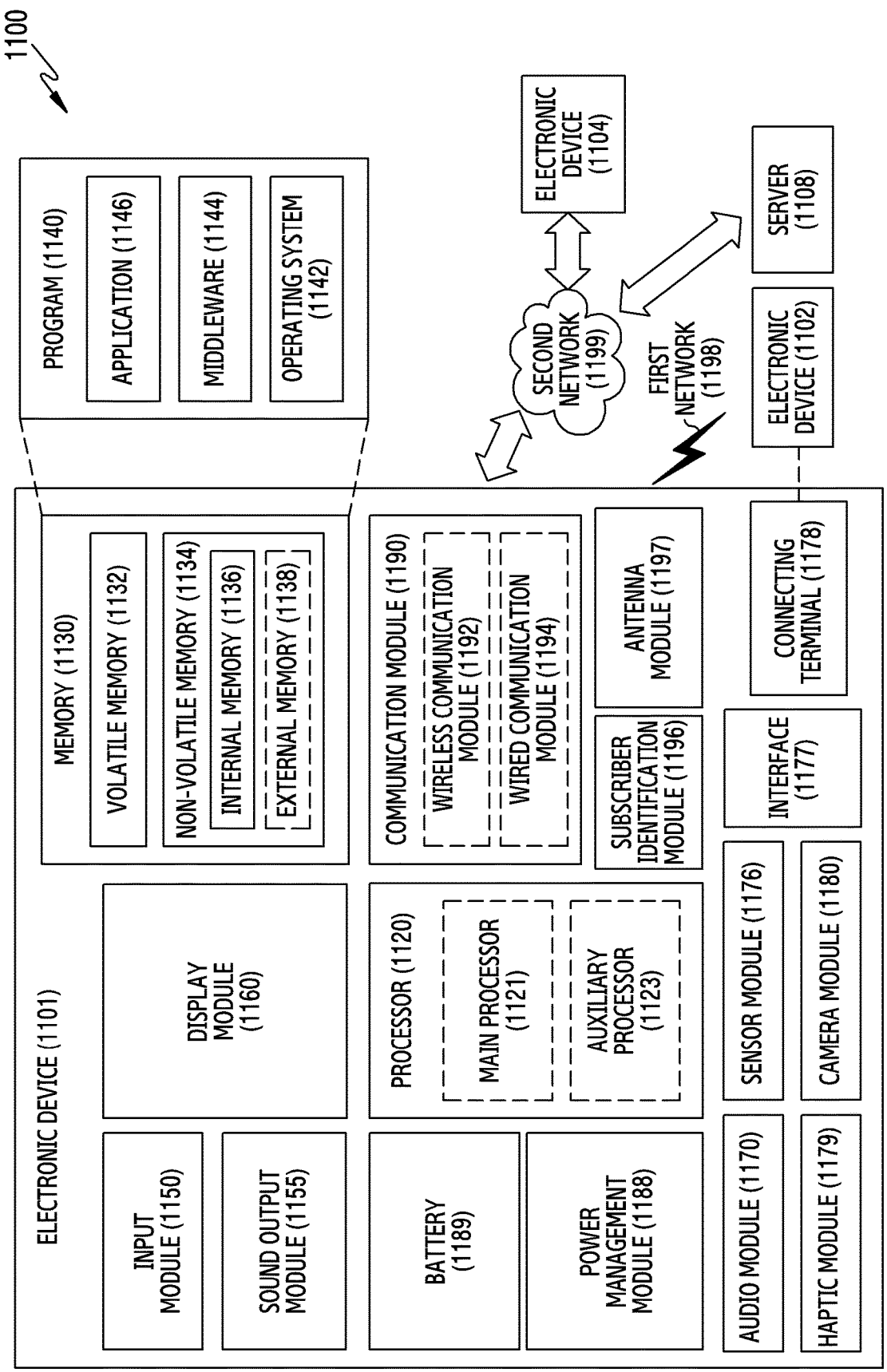
FIG. 11 is a block diagram of an electronic device in a network environment according to an embodiment of the disclosure.

FIG. 11 is a block diagram illustrating an electronic device 1101 in a network environment 1100 according to an embodiment of the disclosure.

Referring to FIG. 11, the electronic device 1101 in the network environment 1100 may communicate with an electronic device 1102 via a first network 1198 (e.g., a short-range wireless communication network), or at least one of an electronic device 1104 or a server 1108 via a second network 1199 (e.g., a long-range wireless communication network). According to an embodiment, the electronic device 1101 may communicate with the electronic device 1104 via the server 1108. According to an embodiment, the electronic device 1101 may include a processor 1120, memory 1130, an input module 1150, a sound output module 1155, a display module 1160, an audio module 1170, a sensor module 1176, an interface 1177, a connecting terminal 1178, a haptic module 1179, a camera module 1180, a power management module 1188, a battery 1189, a communication module 1190, a subscriber identification module (SIM) 1196, or an antenna module 1197. In some embodiments, at least one of the components (e.g., the connecting terminal 1178) may be omitted from the electronic device 1101, or one or more other components may be added in the electronic device 1101. In some embodiments, some of the components (e.g., the sensor module 1176, the camera module 1180, or the antenna module 1197) may be implemented as a single component (e.g., the display module 1160).

The processor 1120 may execute, for example, software (e.g., a program 1140) to control at least one other component (e.g., a hardware or software component) of the electronic device 1101 coupled with the processor 1120, and may perform various data processing or computation. According to one embodiment, as at least part of the data processing or computation, the processor 1120 may store a command or data received from another component (e.g., the sensor module 1176 or the communication module 1190) in volatile memory 1132, process the command or the data stored in the volatile memory 1132, and store resulting data in non-volatile memory 1134. According to an embodiment, the processor 1120 may include a main processor 1121 (e.g., a central processing unit (CPU) or an application processor (AP)), or an auxiliary processor 1123 (e.g., a graphics processing unit (GPU), a neural processing unit (NPU), an image signal processor (ISP), a sensor hub processor, or a communication processor (CP)) that is operable independently from, or in conjunction with, the main processor 1121. For example, when the electronic device 1101 includes the main processor 1121 and the auxiliary processor 1123, the auxiliary processor 1123 may be adapted to consume less power than the main processor 1121, or to be specific to a specified function. The auxiliary processor 1123 may be implemented as separate from, or as part of the main processor 1121.

The auxiliary processor 1123 may control at least some of functions or states related to at least one component (e.g., the display module 1160, the sensor module 1176, or the communication module 1190) among the components of the electronic device 1101, instead of the main processor 1121 while the main processor 1121 is in an inactive (e.g., sleep) state, or together with the main processor 1121 while the main processor 1121 is in an active state (e.g., executing an application). According to an embodiment, the auxiliary processor 1123 (e.g., an image signal processor or a communication processor) may be implemented as part of another component (e.g., the camera module 1180 or the communication module 1190) functionally related to the auxiliary processor 1123. According to an embodiment, the auxiliary processor 1123 (e.g., the neural processing unit) may include a hardware structure specified for artificial intelligence model processing. An artificial intelligence model may be generated by machine learning. Such learning may be performed, e.g., by the electronic device 1101 where the artificial intelligence is performed or via a separate server (e.g., the server 1108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 1130 may store various data used by at least one component (e.g., the processor 1120 or the sensor module 1176) of the electronic device 1101. The various data may include, for example, software (e.g., the program 1140) and input data or output data for a command related thereto. The memory 1130 may include the volatile memory 1132 or the non-volatile memory 1134.

The program 1140 may be stored in the memory 1130 as software, and may include, for example, an operating system (OS) 1142, middleware 1144, or an application 1146.

The input module 1150 may receive a command or data to be used by another component (e.g., the processor 1120) of the electronic device 1101, from the outside (e.g., a user) of the electronic device 1101. The input module 1150 may include, for example, a microphone, a mouse, a keyboard, a key (e.g., a button), or a digital pen (e.g., a stylus pen).

The sound output module 1155 may output sound signals to the outside of the electronic device 1101. The sound output module 1155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 1160 may visually provide information to the outside (e.g., a user) of the electronic device 1101. The display module 1160 may include, for example, a display, a hologram device, or a projector and control circuitry to control a corresponding one of the display, hologram device, and projector. According to an embodiment, the display module 1160 may include a touch sensor adapted to detect a touch, or a pressure sensor adapted to measure the intensity of force incurred by the touch.

The audio module 1170 may convert a sound into an electrical signal and vice versa. According to an embodiment, the audio module 1170 may obtain the sound via the input module 1150, or output the sound via the sound output module 1155 or a headphone of an external electronic device (e.g., an electronic device 1102) directly (e.g., wiredly) or wirelessly coupled with the electronic device 1101.

The sensor module 1176 may detect an operational state (e.g., power or temperature) of the electronic device 1101 or an environmental state (e.g., a state of a user) external to the electronic device 1101, and then generate an electrical signal or data value corresponding to the detected state. According to an embodiment, the sensor module 1176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 1177 may support one or more specified protocols to be used for the electronic device 1101 to be coupled with the external electronic device (e.g., the electronic device 1102) directly (e.g., wiredly) or wirelessly. According to an embodiment, the interface 1177 may include, for example, a high definition multimedia interface (HDMI), a universal serial bus (USB) interface, a secure digital (SD) card interface, or an audio interface.

A connecting terminal 1178 may include a connector via which the electronic device 1101 may be physically connected with the external electronic device (e.g., the electronic device 1102). According to an embodiment, the connecting terminal 1178 may include, for example, a HDMI connector, a USB connector, an SD card connector, or an audio connector (e.g., a headphone connector).

The haptic module 1179 may convert an electrical signal into a mechanical stimulus (e.g., a vibration or a movement) or electrical stimulus which may be recognized by a user via his tactile sensation or kinesthetic sensation. According to an embodiment, the haptic module 1179 may include, for example, a motor, a piezoelectric element, or an electric stimulator.

The camera module 1180 may capture a still image or moving images. According to an embodiment, the camera module 1180 may include one or more lenses, image sensors, image signal processors, or flashes.

The power management module 1188 may manage power supplied to the electronic device 1101. According to one embodiment, the power management module 1188 may be implemented as at least part of, for example, a power management integrated circuit (PMIC).

The battery 1189 may supply power to at least one component of the electronic device 1101. According to an embodiment, the battery 1189 may include, for example, a primary cell which is not rechargeable, a secondary cell which is rechargeable, or a fuel cell.

The communication module 1190 may support establishing a direct (e.g., wired) communication channel or a wireless communication channel between the electronic device 1101 and the external electronic device (e.g., the electronic device 1102, the electronic device 1104, or the server 1108) and performing communication via the established communication channel. The communication module 1190 may include one or more communication processors that are operable independently from the processor 1120 (e.g., the application processor (AP)) and supports a direct (e.g., wired) communication or a wireless communication. According to an embodiment, the communication module 1190 may include a wireless communication module 1192 (e.g., a cellular communication module, a short-range wireless communication module, or a global navigation satellite system (GNSS) communication module) or a wired communication module 1194 (e.g., a local area network (LAN) communication module or a power line communication (PLC) module). A corresponding one of these communication modules may communicate with the external electronic device via the first network 1198 (e.g., a short-range communication network, such as Bluetooth™, wireless-fidelity (Wi-Fi) direct, or infrared data association (IrDA)) or the second network 1199 (e.g., a long-range communication network, such as a legacy cellular network, a fifth generation (5G) network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 1192 may identify and authenticate the electronic device 1101 in a communication network, such as the first network 1198 or the second network 1199, using subscriber information (e.g., international mobile subscriber identity (IMSI)) stored in the subscriber identification module 1196.

The wireless communication module 1192 may support a 5G network, after a fourth generation (4G) network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 1192 may support a high-frequency band (e.g., the millimeter wave (mmWave) band) to achieve, e.g., a high data transmission rate. The wireless communication module 1192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 1192 may support various requirements specified in the electronic device 1101, an external electronic device (e.g., the electronic device 1104), or a network system (e.g., the second network 1199). According to an embodiment, the wireless communication module 1192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 1197 may transmit or receive a signal or power to or from the outside (e.g., the external electronic device) of the electronic device 1101. According to an embodiment, the antenna module 1197 may include an antenna including a radiating element composed of a conductive material or a conductive pattern formed in or on a substrate (e.g., a printed circuit board (PCB)). According to an embodiment, the antenna module 1197 may include a plurality of antennas (e.g., array antennas). In such a case, at least one antenna appropriate for a communication scheme used in the communication network, such as the first network 1198 or the second network 1199, may be selected, for example, by the communication module 1190 (e.g., the wireless communication module 1192) from the plurality of antennas. The signal or the power may then be transmitted or received between the communication module 1190 and the external electronic device via the selected at least one antenna. According to an embodiment, another component (e.g., a radio frequency integrated circuit (RFIC)) other than the radiating element may be additionally formed as part of the antenna module 1197.

According to various embodiments, the antenna module 1197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 1101 and the external electronic device 1104 via the server 1108 coupled with the second network 1199. Each of the electronic devices 1102 or 1104 may be a device of a same type as, or a different type, from the electronic device 1101. According to an embodiment, all or some of operations to be executed at the electronic device 1101 may be executed at one or more of the external electronic devices 1102, 1104, or 1108. For example, if the electronic device 1101 should perform a function or a service automatically, or in response to a request from a user or another device, the electronic device 1101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 1101. The electronic device 1101 may provide the outcome, with or without further processing of the outcome, as at least part of a reply to the request. To that end, a cloud computing, distributed computing, mobile edge computing (MEC), or client-server computing technology may be used, for example. The electronic device 1101 may provide ultra low-latency services using, e.g., distributed computing or mobile edge computing. In another embodiment, the external electronic device 1104 may include an internet-of-things (IoT) device. The server 1108 may be an intelligent server using machine learning and/or a neural network. According to an embodiment, the external electronic device 1104 or the server 1108 may be included in the second network 1199. The electronic device 1101 may be applied to intelligent services (e.g., smart home, smart city, smart car, or healthcare) based on 5G communication technology or IoT-related technology.

An electronic device according to various embodiments may include a first housing, a second housing connected to the first housing via a connection member to be rotatable with respect to the first housing, and a wireless communication circuit disposed in the first housing or the second housing, wherein the first housing includes a first edge having a first length, a first portion of the first edge is formed of a conductive material, an insulation member is disposed at one end of the first portion, the other end of the first portion is connected to a conductive area of the connection member, a first point of the first portion is connected to a feeding point via a capacitor having a designated value, the second housing includes a second edge corresponding to the first edge when the first housing and the second housing face each other, a second portion of the second edge corresponding to the first portion is formed of a conductive material, the second housing includes an opening formed along and adjacent to the second portion, an insulation member is disposed at one end of the second portion, the other end of the second portion is connected to the conductive area of the connection member, a switch is disposed between a first point of the second portion and a ground area, and the wireless communication circuit controls the switch when the first housing and the second housing face each other, thereby electrically opening the ground area and the first point of the second portion.

In an embodiment, a second point of the first portion spaced a designated distance apart from the first point of the first portion may be connected to the ground area via a switching circuit.

In an embodiment, the wireless communication circuit may control the switching circuit connected to the second point of the first portion to change a frequency band of a signal received via the wireless communication circuit.

In an embodiment, the frequency band of a signal received via the wireless communication circuit may be less than or equal to 900 MHZ.

In an embodiment, the wireless communication circuit may open the switch when the first housing and the second housing face each other, and thus induce a current directed to the same direction to the first edge and the second edge.

In an embodiment, the wireless communication circuit may control the switch when the first housing and the second housing do not face each other, and may thus electrically connect the ground area and the first point of the second portion.

In an embodiment, when the first housing and the second housing face each other, the wireless communication circuit may connect the switch to a capacitor having a designated value, and thus change a frequency band of signals transmitted or received via the wireless communication circuit.

In an embodiment, the first housing may include an opening formed along and adjacent to the first portion.

In an embodiment, at least one of the opening formed along and adjacent to the first portion and an opening formed along and adjacent to the second portion may be filled with a non-conductive material.

In an embodiment, the electronic device may further include a first area corresponding to the first housing, a second area corresponding to the second housing, and a flexible display disposed over a third area corresponding to the connection member, wherein the flexible display may be bent to correspond to an angle formed by the first housing and the second housing around the connecting member.

In an embodiment, the first housing may include a third edge having a second length shorter than the first length and extending from one end of the first edge, and the second housing may include a fourth edge having the second length and extending from one end of the second edge.

In an embodiment, a third portion of the third edge may be formed of a conductive material, insulation members may be arranged at opposite ends of the third portion of the third edge, and one point of the third portion of the third edge may be connected to a feeding point.

In an embodiment, the wireless communication circuit may transmit and/or receive a signal via an electrical path corresponding to the third portion of the third edge.

In an embodiment, the first housing may include a third edge having a second length longer than the first length and extending from one end of the first edge, the second housing may include a fourth edge having the second length and extending from one end of the second edge, and the connection member may be disposed to be parallel to the third edge and the fourth edge.

In an embodiment, a sum of the first length of the first edge and a second length of the second edge may be greater than or equal to 150 mm.

An electronic device according to various embodiment may include a wireless communication circuit disposed in the electronic device, wherein the electronic device includes a first edge having a first length and a second edge having a second length, a first portion of the first edge is formed of a conductive material, an insulation member is disposed at one end of the first portion, a first point of the first portion is connected to a feeding point via a capacitor having a designated value, when the electronic device is in a folded state, the second edge corresponding to the first edge is included, a second portion of the second edge corresponding to the first portion is formed of a conductive material, an opening formed along and adjacent to the second portion is included, an insulation member is disposed at one end of the second portion, the other end of the second portion is electrically connected to a conductive area of the first portion, a switch is disposed between a first point of the second portion and a ground area, and the wireless communication circuit controls the switch when the electronic device is in a folded state, thereby electrically opening the ground area and the first point of the second portion.

In an embodiment, the second point of the first portion spaced a designated distance apart from the first point of the first portion may be connected to the ground area via a switching circuit.

In an embodiment, the wireless communication circuit may control the switching circuit connected to the second point of the first portion, and may thus change a frequency band of a signal received via the wireless communication circuit.

In an embodiment, the wireless communication circuit may open the switch in a folded state of the electronic device, and thus induce a current directed to the same direction to the first edge and the second edge.

In an embodiment, the wireless communication circuit may control the switch in an unfolded state of the electronic device, and thus electrically connect the ground area and the first point of the second portion to each other.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 1140) including one or more instructions that are stored in a storage medium (e.g., internal memory 1136 or external memory 1138) that is readable by a machine (e.g., the electronic device 1101). For example, a processor (e.g., the processor 1120) of the machine (e.g., the electronic device 1101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
   a first housing;
   a second housing connected to the first housing via a connection member to be rotatable with respect to the first housing; and
   a wireless communication circuit disposed in the first housing or the second housing,
   wherein the first housing comprises:
      a first edge having a first length,
      a first portion of the first edge is formed of a conductive material,
      an insulation member is disposed at one end of the first portion, and a conductive area of the connection member is connected another end of the first portion, and
      a first point of the first portion is connected to a feeding point via a capacitor having a designated value,
   wherein the second housing comprises:
      a second edge having a second length corresponding to the first length of the first edge,
      a second portion of the second edge corresponding to the first portion is formed of a conductive material,
      an opening is formed along and adjacent to the second portion,
      an insulation member is disposed at one end of the second portion, and the conductive area of the connection member is connected to another end of the second portion, and
      a switch is disposed between a first point of the second portion and a ground area, and
   wherein the wireless communication circuit is configured to control the switch, in case that the first housing and the second housing face each other, to electrically disconnect the ground area and the first point of the second portion.

2. The electronic device of claim 1, wherein a second point of the first portion spaced a designated distance apart from the first point of the first portion is connected to the ground area via a switching circuit.

3. The electronic device of claim 2, wherein the wireless communication circuit is configured to control the switching circuit connected to the second point of the first portion to change a frequency band of a signal received via the wireless communication circuit.

4. The electronic device of claim 3, wherein a frequency band of a signal received via the wireless communication circuit is less than or equal to 900 MHz.

5. The electronic device of claim 1, wherein, in case that the first housing and the second housing face each other, the wireless communication circuit is configured to open the switch to induce a current directed in an identical direction to the first edge and the second edge.

6. The electronic device of claim 1, wherein, in case that the first housing and the second housing do not face each other, the wireless communication circuit is configured to control the switch electrically connect the ground area and the first point of the second portion.

7. The electronic device of claim 6, wherein, in case that the first housing and the second housing face each other, the wireless communication circuit is configured to:
   connect the switch to a capacitor having a designated value; and
   change a frequency band of signals transmitted and/or received via the wireless communication circuit.

8. The electronic device of claim 1, wherein the first housing comprises a first opening formed along and adjacent to the first portion.

9. The electronic device of claim 8, wherein at least one of the first opening formed along and adjacent to the first portion and a second opening formed along and adjacent to the second portion is filled with a non-conductive material.

10. The electronic device of claim 9, wherein the first housing further comprises a first lateral surface.

11. The electronic device of claim 10, wherein the capacitor having the designated value is configured to supply a current to the first lateral surface via the first point.

12. The electronic device of claim 11, wherein the current supplied to the first lateral surface does not flow to the first edge of the first housing.

13. The electronic device of claim 12, wherein, based on the current supplied to the first lateral surface, a first current flows along the first opening of the first housing in a clockwise direction, and a second current flows along the second opening of the second housing in a counterclockwise direction.

14. The electronic device of claim 13, wherein the designated value of the capacitor is 10 picofarad (pF) or less.

15. The electronic device of claim 1, further comprising:
a flexible display,
wherein the flexible display is bent to correspond to an angle formed by the first housing and the second housing around the connecting member.

16. The electronic device of claim 1,
wherein the first housing comprises a third edge having a second length shorter than the first length and extending from one end of the first edge, and
wherein the second housing comprises a fourth edge having the second length and extending from one end of the second edge.

17. The electronic device of claim 16,
wherein a third portion of the third edge is formed of a conductive material,
wherein insulation members are arranged at opposite ends of the third portion of the third edge, and
wherein one point of the third portion of the third edge is connected to a feeding point.

18. The electronic device of claim 17, wherein the wireless communication circuit is configured to transmit and/or receive a signal via an electrical path comprising the third portion of the third edge.

19. The electronic device of claim 1,
wherein the first housing comprises a third edge having a second length longer than the first length and extending from one end of the first edge,
wherein the second housing comprises a fourth edge having the second length and extending from one end of the second edge, and
wherein the connection member is disposed to be parallel to the third edge and the fourth edge.

20. The electronic device of claim 1, wherein a sum of the first length of the first edge and the second length of the second edge is greater than or equal to 150 mm.

* * * * *